(12) United States Patent
Mehendale

(10) Patent No.: US 12,437,182 B2
(45) Date of Patent: Oct. 7, 2025

(54) NEURAL NETWORK ACCELERATION

(71) Applicant: TEXAS INSTRUMENTS INCORPORATED, Dallas, TX (US)

(72) Inventor: Mahesh M. Mehendale, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1005 days.

(21) Appl. No.: 17/369,209

(22) Filed: Jul. 7, 2021

(65) Prior Publication Data

US 2023/0012127 A1    Jan. 12, 2023

(51) Int. Cl.
*G06N 3/04*    (2023.01)

(52) U.S. Cl.
CPC ...................... *G06N 3/04* (2013.01)

(58) Field of Classification Search
CPC ........................................... G06N 3/04
USPC ........................................... 706/26
See application file for complete search history.

(56) References Cited

U.S. PATENT DOCUMENTS

| | | | | |
|---|---|---|---|---|
| 4,352,162 A * | 9/1982 | Nyuji | ............. | G10L 13/047 708/318 |
| 5,987,489 A * | 11/1999 | Monier | ............. | G06F 7/728 708/492 |
| 6,035,317 A * | 3/2000 | Guy | ............. | G06F 7/728 708/492 |
| 6,341,299 B1 * | 1/2002 | Romain | ............. | G06F 7/5443 708/523 |
| 6,539,368 B1 * | 3/2003 | Chernikov | ............. | G06N 3/048 706/41 |
| 6,836,839 B2 * | 12/2004 | Master | ............. | G06F 13/4027 712/18 |
| 9,996,890 B1 * | 6/2018 | Cinnamon | ............. | G06V 10/764 |
| 10,366,293 B1 * | 7/2019 | Faviero | ............. | G06N 3/08 |
| 10,452,959 B1 * | 10/2019 | Gautam | ............. | G06V 10/82 |
| 10,642,620 B2 * | 5/2020 | Uliel | ............. | G06F 9/3836 |
| 2008/0263115 A1 * | 10/2008 | Morad | ............. | G06F 9/325 708/604 |
| 2009/0055455 A1 * | 2/2009 | Matsuyama | ............. | G06F 17/142 708/231 |
| 2015/0381216 A1 * | 12/2015 | Shor | ............. | H04L 25/03853 375/297 |
| 2016/0357705 A1 * | 12/2016 | Shibayama | ............. | H03H 17/0213 |
| 2016/0358070 A1 * | 12/2016 | Brothers | ............. | G06N 3/045 |
| 2017/0203560 A1 * | 7/2017 | Nitta | ............. | B41J 2/04591 |
| 2017/0323454 A1 * | 11/2017 | Mehendale | ............. | H04N 19/523 |
| 2020/0160158 A1 * | 5/2020 | Okamoto | ............. | G06F 7/5443 |
| 2021/0182676 A1 * | 6/2021 | Zlateski | ............. | G06N 3/08 |

(Continued)

*Primary Examiner* — Reza Nabi
(74) *Attorney, Agent, or Firm* — Frank D. Cimino

(57) ABSTRACT

For neural network acceleration, a datapath can be configured to implement a convolution computation. A control unit can be configured to coordinate operations of the datapath to implement the convolution computation based on coded instructions representative of a neural network system. The control unit can be configured to command the datapath to convolve at least one input feature element of a set of input feature elements of at least one input feature map with at least one discretized weight of a set of discretized weights to compute an influence that the at least one input feature element of the set of input feature elements of the least one input feature map has on one or more output feature elements of at least one output feature map.

17 Claims, 14 Drawing Sheets

(56) References Cited

U.S. PATENT DOCUMENTS

| | | | |
|---|---|---|---|
| 2021/0302960 A1* | 9/2021 | McGill, Jr. | G06N 3/042 |
| 2022/0138565 A1* | 5/2022 | Li | G06N 3/08 |
| | | | 706/25 |
| 2022/0215654 A1* | 7/2022 | Shlens | G06N 3/04 |
| 2023/0012127 A1* | 1/2023 | Mehendale | G06N 3/063 |
| 2024/0099593 A1* | 3/2024 | Valys | G16H 50/70 |

\* cited by examiner

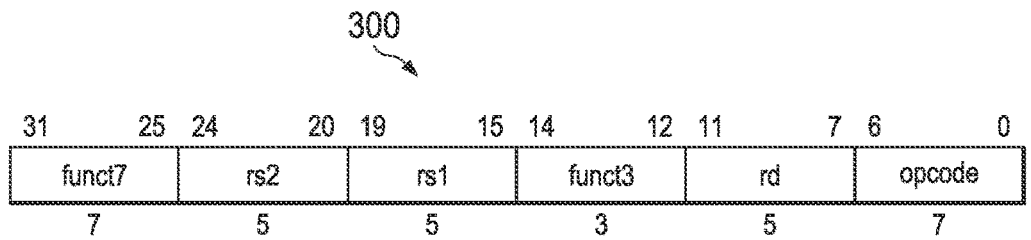

FOR (k=0 TO 7) {
    IF (in-data[0]||in-data[1]||in-data[2]||in-data[3])==0) {
        skip-cycle
    } ELSE {
        IF (wts[k]==1) {
            out-data[k][0] += in-data[0]; out-data[k][1] += in-data[1];
            out-data[k][2] += in-data[2]; out-data[k][3] += in-data[3];
        } ELSE IF (wts[k] == -1) {
            out-data[k][0] -= in-data[0]; out-data[k][1] -= in-data[1];
            out-data[k][2] -= in-data[2]; out-data[k][3] -= in-data[3];
        } ELSE {
            skip-cycle
        }
    }
}
```

FOR (k=0 TO 4) {
    out-data[k][0] += wts[0][k]*in-data[0][0] + wts[1][k]*in-data[1][0]
    out-data[k][1] += wts[0][k]*in-data[0][1] + wts[1][k]*in-data[1][1]
    out-data[k][2] += wts[0][k]*in-data[0][2] + wts[1][k]*in-data[1][2]
    out-data[k][3] += wts[0][k]*in-data[0][3] + wts[1][k]*in-data[1][3]
}
```

FIG. 7

```
FOR (k=0 TO 7) {
    out-data[k] += wts[0][k]*in-data[0] + wts[1][k]*in-data[1]
}
```

2000

ADD3s rs1, rs2, rd => <rd> = <rd> + ((<rs1> + <rs2>) >> 1)
SUB3s rs1, rs2, rd => <rd> = <rd> - ((<rs1> + <rs2>) >> 1)
ADDSUBs rs1, rs2, rd => <rd> = <rd> + ((<rs1> - <rs2>) >> 1)

2100

ADD3 rs1, rs2, rd => <rd> = <rd> + (<rs1> + <rs2>)
SUB3 rs1, rs2, rd => <rd> = <rd> - (<rs1> + <rs2>)
ADDSUB rs1, rs2, rd => <rd> = <rd> + (<rs1> - <rs2>)

```
FOR (i=0 TO H-1) {
    FOR (j=0 TO W-1) {
        FOR (m=0 TO (M/4)-1) {
            FOR (n=0 TO N-1) {
                Y[n][i][j] += (X[4*m][i][j] * K[4*m,n] +
                               X[4*m+1][i][j] * K[4*m+1,n] +
                               X[4*m+2][i][j] * K[4*m+2,n] +
                               X[4*m+3][i][j] * K[4*m+3,n]
```

| 1502 | 1506 | 1504 | 1508 |
|------|------|------|------|
| 0000 | 0 | 1000 | X4 |
| 0001 | X1 | 1001 | X4+X1 |
| 0010 | X2 | 1010 | X4+X2 |
| 0011 | X2+X1 | 1011 | X4+X2+X1 |
| 0100 | X3 | 1100 | X4+X3 |
| 0101 | X3+X1 | 1101 | X4+X3+X1 |
| 0110 | X3+X2 | 1110 | X4+X3+X2 — 1510 |
| 0111 | X3+X2+X1 | 1111 | X4+X3+X2+X1 |

| 1702 | 1706 | 1704 | 1708 |
|---|---|---|---|
| 0 0 0 0 | -X1-X2-X3-X4 (1710) | 1 0 0 0 | X1-X2-X3-X4 |
| 0 0 0 1 | -X1-X2-X3+X4 | 1 0 0 1 | X1-X2-X3+X4 |
| 0 0 1 0 | -X1-X2+X3-X4 | 1 0 1 0 | X1-X2+X3-X4 |
| 0 0 1 1 | -X1-X2+X3+X4 | 1 0 1 1 | X1-X2+X3+X4 |
| 0 1 0 0 | -X1+X2-X3-X4 | 1 1 0 0 | X1+X2-X3-X4 |
| 0 1 0 1 | -X1+X2-X3+X4 | 1 1 0 1 | X1+X2-X3+X4 |
| 0 1 1 0 | -X1+X2+X3-X4 | 1 1 1 0 | X1+X2+X3-X4 |
| 0 1 1 1 | -X1+X2+X3+X4 | 1 1 1 1 | X1+X2+X3+X4 |

NEURAL NETWORK ACCELERATION

TECHNICAL FIELD

This description generally relates to neural network acceleration.

BACKGROUND

Artificial neural networks (ANNs) are computing systems inspired by biological neural networks that constitute a biological brain. Such systems "learn" to perform tasks by considering examples, generally without being programmed with any task-specific rules. An ANN is a model based on a collection of connected units or nodes called "artificial neurons." An artificial neuron that receives information can process the information and then signal additional artificial neurons connected to it. The connections between artificial neurons are called "edges". Artificial neurons and edges typically have a weight that adjusts as learning proceeds during a training phase. The weight increases or decreases the strength of the information at a connection. Artificial neurons can be aggregated into layers. Different layers may perform different kinds of transformations on input information. For example, neural networks can be created from at least three layers of neurons: an input layer, a hidden layer, and an output layer. Deep learning is a class of machine learning algorithms that uses multiple layers to progressively extract higher-level features from input data. For example, in image processing, lower layers may identify edges, while higher layers may identify the concepts relevant to a human such as digits, letters, or faces.

SUMMARY

In a described example, a system can include a datapath that can be configured to implement a convolution computation for a neural network system. The datapath can include one or more source registers and destination registers. The one or more source registers can include at least one discretized weight and input feature elements of an input feature map. Each destination register of the destination registers can include a respective output feature element output feature elements of an output feature map. The system can include a control unit that can be coupled to the data path. The control unit can be configured to command the datapath to implement the convolution computation based on convolution layer instructions representative of a convolution layer of the neural network system. The convolution layer instructions can be programmed to control the datapath to convolve respective input feature elements of the input feature map based on the at least one discretized weight to compute an influence that each of the respective input feature elements of the input feature map has on the respective output feature element of the output feature elements of the output feature map.

In a further described example, a system can include a datapath that can include a first source register, a second source register, and a destination register. The first source register can include a set of discretized weights, the second source register can include input feature elements of an input feature map, and the destination register can include one or more output feature elements of an output feature map. The datapath can be configured to implement a convolution computation for a neural network system. The system can include a control unit that can be coupled to the datapath. The control unit can be configured to command the datapath to implement the convolution computation based on fully connected layer instructions representative of a fully connected layer of the neural network system. The fully connected layer instructions can be programmed to control the datapath to convolve respective input feature elements of the input feature map with a respective discretized weight of the set of discretized weights to compute an influence that each respective input feature element of the input feature map has on the one or more output feature elements of the output feature map.

In another described example, a system can include a lookup table (LUT) register file that can include a LUT comprising respective LUT values representing an influence that input feature elements of an input feature map has on at least one output feature element of an output feature map. The system can include a control unit that can be coupled to the LUT register file. The control unit can be configured to command the LUT register file to implement convolution computation based on convolution layer instructions configured to provide a convolution layer of a neural network system. The LUT register file, responsive to at least one command issued by the control unit based on the convolution layer instructions, can be configured to receive discretized weights for the input feature elements of the input feature map. Each discretized weight of the discretized weights can be representative of an address for LUT values of the LUT. The LUT register file, responsive to the at least one command issued by the control unit based on the convolution layer instructions, can be configured identify first and second LUT values from the respective LUT values using the discretized weights, and update a respective value representative of the at least one output feature element of the output feature map in response to identifying the first and second LUT values to indicate the influence that the input feature elements of the input feature map have on the at least one output feature element of the output feature map.

BRIEF DESCRIPTION OF THE DRAWINGS

FIG. 3 is an example of a computer instruction.

FIG. 4 is an example of a portion of pseudocode of a neural network system.

FIG. 7 is an example of a portion of pseudocode of a neural network system.

FIG. 14 is an example of a portion of pseudocode of a neural network system.

FIG. 15 is an example of a LUT.

DETAILED DESCRIPTION

Figure 1:
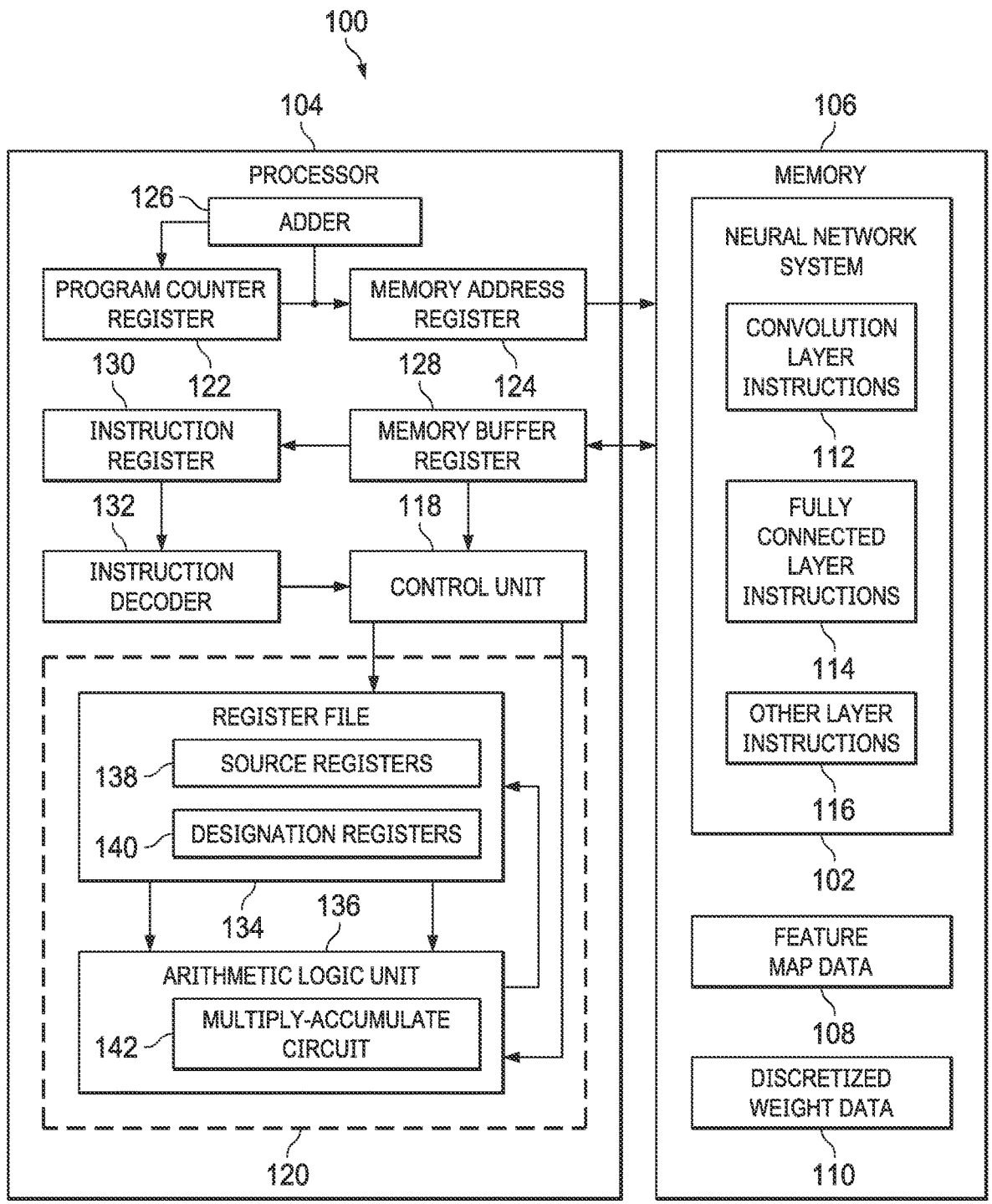
FIG. 1 is a block diagram of a computing system configured to implement a neural network system.

This description relates to neural network inference phase acceleration. It can also be used to accelerate forward path during neural network training. As neural networks, such as deep neural networks (DNNs), become more complex, a number of layers, number of weights, and computational cost increases thereby limiting use of neural networks on semiconductor devices, such as a microcontroller used in resource constrained devices. Examples of such devices include embedded devices, consumer electronics, smart wearable devices, augmented reality (AR), virtual reality (VR), mobile phones, drones, self-driving cars, and the like. Deep Neural networks require a high number of weights, which if represented in full-precision (e.g., 32 bits) constrain resources of low power-edge (resource constrained) devices. Thus, performing inferences on such devices is challenging due to the limited availability of memory and computational resources, which further complicates achieving real-time performance and low power. For example, convolving feature elements of input feature maps with full-precision weights, such as represented as 32 or more bits, requires higher memory read/write bandwidth and datapath with high precision datapath to perform convolution operations. The term feature element as used herein can refer to an individual data point of a feature map.

System and methods are described herein to accelerate an inference phase of a neural network using discretized weights that allow for real-time implementation of neural networks on resource constrained devices. Weighted discretization refers to using weights having a reduced precision, such as binary, ternary, or quaternary values. By using discretized (e.g., quantized) weights, the inference phase of neural networks can be accelerated to allow for real-time application processing (e.g., speech recognition, computer vision, machine vision, natural language processing (NLP), audio recognition, image recognition, and the like) on resource limited devices. Moreover, discretized weights also reduce the memory needed to store such weights.

For example, a computing system includes a control unit and datapath. The datapath can be configured to implement at least one convolution computation for a neural network system. The control unit can be configured to command the datapath to implement the at least one convolution computation based on convolution layer instructions representative of a convolution layer of the neural network system. The control unit can be configured to command the datapath to convolve each input feature element of a set of input feature elements of an input feature map with at least one discretized weight to compute the influence that the set of input feature elements of the input feature map have on respective output feature elements of at least one output feature map. For example, the convolution layer instructions can be multi-cycle instructions that can perform over a k number of clock cycles multiply-accumulate (MAC) operations to compute the influence for the at least one convolution layer, wherein k is a positive integer denoting the number of clock cycles for the control unit. The convolution layer instructions can be programmed to control the control unit to coordinate operations of the datapath for simultaneous processing of the set of input feature elements of the input feature map during each clock cycle over a k number of clock cycles. As a result, the control unit can efficiently compute the influence of the set of input feature elements has on the respective output feature elements of the output feature map.

For example, the control unit is configured to command the datapath to implement the at least one convolution computation based on fully connected layer instructions representative of a fully connected layer of the neural network system. For example, the control unit is configured to control the datapath to implement the fully connected layer instructions and compute an influence that a set of input feature elements of an input feature map has on respective output feature elements of a set of output feature elements of a respective output feature map. For example, the fully connected layer instructions can be multi-cycle instructions that can perform MAC operations over multiple clock cycles to compute the influence for the fully connected layer. Accordingly, the control unit can be configured to coordinate operations of the datapath to update the set of output feature elements of the respective output feature map to indicate an influence a respective input feature element of the set of input feature elements has on a respective output feature element of the set of output feature elements based on a respective subset of discretized weights, as described herein.

For example, the control unit is configured to command the datapath to implement the convolution computation based on convolution layer instructions to implement feature element influence computations according to a LUT. For example, the datapath includes a LUT register file. The LUT register file can include a LUT having a set of LUT values adapted to compute an influence that a set of input feature elements of an input feature map has on at least one output feature element of an output feature map. The control unit can be configured to command the LUT register file to implement convolution computation based on the convolution layer instructions. The control unit can be configured to command the LUT register file to compare the set of discretized weights to at least one address column of the LUT to identify first and second LUT values from the set LUT values. The control unit can be configured to command the LUT register file to update a value representative of the at least one output feature element of the output feature map based on the first and second LUT values to influence the at least one output feature element of the output feature map based on the set of input feature elements. Accordingly, the set of discretized weights can be used for addressing the LUT, such that the computing system can be configured to compute in a single clock cycle the influence that the set of input feature elements of the input feature map has on the output feature elements of the output feature map.

FIG. 1 is a block diagram of a computing system 100 configured to implement a neural network system 102. The computing system 100 can include a processor 104. For example, the processor 104 is a complex instruction set computer (CISC)-type CPU, a reduced instruction set computer (RISC)-type CPU, a microcontroller unit (MCU), or a digital signal processor (DSP). In an example, the processor 104 is a programmable RISC processor. In another example, the CPU is implemented as a graphics processing unit (GPU). While examples are presented herein for neural network acceleration on RISC-type processors, the examples described herein are not limited to such instruction set architectures (ISA). In other examples, a CPU with a different ISA can be used to implement the neural network system 102.

The computing system 100 can include memory 106. The memory 106 can include random access memory (RAM). Alternatively, the memory 106 may include another type of memory device. The memory 106 can store coded instructions (e.g., computer and/or machine readable instructions) that can be representative of the neural network system 102. The processor 104 can execute the coded instructions representative of the neural network system 102 to implement neural network processing of input feature maps (e.g., for feature extraction or identification). The memory 106 can store the input feature maps as feature map data 108. The neural network system 102 can include a number of layers for processing the input feature maps. The number of layers can be based on an application in which the neural network system 102 is to be employed. For example, the neural network system 102 includes an input layer and an output layer, and a number of convolution layers, rectified linear unit (ReLU) layers, batch normalization layers, max-pooling layers, softmax layers, dropout layers, and/or fully connected layers.

For example, at least some of the layers of the neural network system 102 include a set of weights. The set of weights can be determined during a training process of the neural network system 102. During a training process, the neural network system 102 can be trained based on a forward and backward propagation process executed over a number of iterations to compute the sets of weights for respective layers of the neural network system 102. For example, during the training phase, discretized weights can be computed for at least some of the layers of the neural network, such as at least one convolution layer or fully connected layer of the neural network system 102. Each discretized weight of the at least one convolution layer or fully connected layer can be a lower resolution version of the weight in comparison to full resolution version of the weight. For example, during the training phase of the neural network system 102, a higher resolution of the computed weight (e.g., a 32-bit version) is optimized (e.g., using quantization) and thus transformed into a lower resolution representation (e.g., discretized weight, such as a 2-bit version). Each discretized weight of the at least one convolution layer or fully connected layer that is to be used during run time of the neural network system 102 can be stored as part of discretized weight data 110 in the memory 106. The discretized weights can be stored in a packed format (e.g., one (1) 32-bit memory location can store sixteen (16) ternary weights). The discretized weight data 110 can include a first discretized weight space and a second discretized weight space. The first discretized weight space can include discretized weights of the at least one convolution layer and the second discretized weight space can include discretized weights of the at least one fully connected layer.

The coded instructions that are representative of the neural network system 102 stored in the memory 106 can include convolution layer instructions 112, fully connected layer instructions 114, and other layer instructions 116. The processor 104 can be configured to execute the convolution layer instructions 112. The convolution layer instructions 112 are configured to convolve at least one input feature element of at least one input feature map with one or more discretized weights from the first discretized weight space to compute an influence that the at least one input feature element has on one or more output feature element of respective output feature maps. Each output feature map can be stored as part of the feature map data 108.

For example, the processor 104 is configured to execute the fully connected layer instructions 114 to implement learning (e.g., classification) on at least one input feature map from a previous layer (e.g., from a convolution layer, a pooling layer, and the like) into a number of various classes. During the learning, the fully connected layer instructions 114 can be programmed to convolve at least two input feature elements of the at least one input feature map from the previous layer with a set of discretized weights from the second discretized weight space to compute an influence that the at least two input feature elements have on an at least two output feature elements of a respective output feature map. The processor 104 can be configured to execute the other layer instructions 116 to implement processing of input feature maps through other layers of the neural network system 102 (e.g., for feature identification).

For example, the processor 104 includes a control unit 118 and a datapath 120. The control unit 118 can be configured to command (e.g., control) the datapath 120 based on the coded instructions representing the neural network system 102. Thus, the control unit 118 can be configured to control the datapath 120 to implement data processing operations on the feature map data 108 and discretized weight data 110. For example, the data processing operations include convolution processing operations, as specified by the convolution layer and/or fully connected layer instructions 112 and 114.

For example, the processor 104 includes a program counter (PC) register 122. The PC register 122 can be configured to hold an address of a next program instruction, such as an instruction of one of the convolution and fully connected layer instructions 112 and 114. The PC register 122 can be configured to provide the address of the next program instruction to a memory address register 124 of the processor 104. The memory address register 124 can be configured to provide the address for the next program instruction in the memory 106. The processor 104 can include an adder 126 that can be configured to receive the address of the next program instruction and increment the PC register 122 for a subsequent program instruction of the convolution layer and/or fully connected layer instructions 112 and 114.

The memory 106 can include a memory controller (not shown in FIG. 1) that can be configured to provide the program instruction stored at the address provided by the memory address register 124 to a memory buffer register 128 of the processor 104. The memory buffer register 128 can be configured to store information (e.g., instructions, data, and the like) that is being sent to or received from the memory 106. For example, the memory buffer register 128 is configured to provide the program instruction to an instruction register 130 of the processor 104. An instruction decoder 132 of the processor 104 is configured to decode the program instruction at the instruction register 130 and determine an operation that is to be carried out by the control unit 118. The control unit 118 is configured to coordinate functionality (e.g., operations) of the datapath 120 to implement the operation identified by each respective decoded program instruction. The example of FIG. 1 shows the PC register 122, the memory address register 124, and the adder 126 as outside the datapath 120. In another example, the PC register 122, the memory address register 124, and the adder 126 can be part of the datapath 120.

The datapath 120 can include a register file 134 and an arithmetic logic unit (ALU) 136. For example, the control unit 118 is configured to command the ALU 136 to compute an influence that a set of input feature element of a respective input feature map has on a set of output feature elements of a respective output feature map based on the convolution layer and fully connected layer instructions 112 and/or 114. Each input feature element can have a defined bit-width (e.g., a fixed number of bits). For example, each input feature element of the set of input feature elements can have 8-bits or 16-bits. The register file 134 can include source registers 138 and destination registers 140. A number of source and destination registers 138 and 140 of the register file 134 and a bit width of the source and destination registers 138 and 140 can be set according to the ISA of the processor 104. For example, the source and destination registers 138 and 140 each are 32 bits.

The source registers 138 can be used to store operand data for processing by the ALU 136, and the destination registers 140 can store one or more results of an operation implemented by the ALU 136. In additional examples, a respective register (e.g., a source register of the source registers 138 or a destination register of the destination registers 140) can be configured as a source and destination register. For example, in a multiply-accumulate operation, the respective register can store an output feature element and can be updated to indicate an influence that at least one input feature element has on the output feature element.

For example, to implement convolution at the convolution layer, the control unit 118 is configured to load the set of input feature elements into the source registers 138 responsive to the convolution layer instructions 112. By way of example, the set of input feature elements can be provided to the memory buffer register 128 from the memory 106, which the control unit 118 can be configured to access for loading of the set of input feature elements into the source register 138. For example, each input feature element of the set of input feature elements has 8 bits, and the control unit 118 is configured to load the set of input feature elements into a respective source register of the source registers 138. For example, the control unit 118 is configured to load the set of input feature elements into a first source register of the source registers 138 responsive to the convolution layer instructions 112.

The control unit 118 is configured to load the set of discretized weights of the first discretized weight space into a second source register responsive to the convolution layer instructions 112. By way of example, the set of discretized weights can be provided to the memory buffer register 128 from the memory 106, which the control unit 118 can be configured to access for loading of the set of discretized weights into the second source register. As described above, the first discretized weight space is adapted to determine an influence that each input feature element of the set of input feature elements has on a respective output feature element of the set of output feature elements responsive to the convolution layer instructions 112. Each discretized weight of the set of discretized weights can have a defined number of bits. For example, each discretized weight has a value represented by 2-bits.

For example, each discretized weight is one of a binary weight or ternary weight computed during the training process of the neural network system 102. For example, two (2) bits can be used to represent a ternary weight, and one (1) bit can be used to represent a binary weight. In an example where the source registers 138 are 32-bits, the set of discretized weights can include eight (8) discretized weights, in which each respective discretized weight is 2-bits. Each discretized weight of the set of discretized weights can have a value adapted to control an amount of influence that at least one input feature element of the respective input feature map has on at least one output feature element of one or more output feature maps. The first and second source registers of the register file 134 can be configured to provide the set of input feature elements stored at the first source register and the set of discretized weights stored at the second source register to the ALU 136 responsive to respective commands issued by the control unit 118 based on the convolution layer instructions 112.

For example, the control unit 118 is further configured to load respective output feature elements of the respective output feature map into respective destination registers of the destination registers 140 responsive to the convolution layer instructions 112. The control unit 118 is configured to store updated output feature elements of the respective output feature map stored at the respective destination registers following convolution computations back in the memory 106 as part of the feature map data 108 responsive to the convolution layer instructions 112, as described herein. By way of example, the set of output feature elements of the respective output feature map can be provided to the memory buffer register 128 from the memory 106, which the control unit 118 can be configured to access for loading of the set of output feature elements of the respective output feature map into the destination register. The set of output feature elements can have a defined bit-width and can be a subset of feature elements of the respective output feature map. The respective destination registers can store a value representative of a respective output feature element of the set of output feature elements.

As a further example, the control unit 118 is configured to control operations of the ALU 136 to convolve each input feature element stored at the first source register with at least one weight stored at the second source register using MAC operations based on the convolution layer instructions 112. For example, the ALU 136 includes a combinational digital circuit configured to perform MAC operations. The combinational digital circuit of the ALU 136 can be referred to herein as a MAC circuit. Thus, the ALU 136 can include one or more MAC circuits 142. The MAC circuit 142 can be configured to perform MAC operations over one or more number of clock cycles based on the set of input feature elements and the set of discretized weights to update the set of output feature elements of the respective output feature maps stored at respective destination registers of the destination registers 140. For example, the MAC circuit 142 is configured to implement MAC operations over eight (8) clock cycles to compute the influence that the set of input feature elements of the respective input feature map have on each output feature element of a set of output feature elements for respective output feature maps based on a respective discretized weight of the set of weights.

For example, the MAC circuit 142 is configured to convolve the respective input feature elements and the respective discretized weights using MAC operations. In examples in which the discretized set of weights employ ternary weights, the MAC operation can be referred to as a ternary MAC operation. The MAC circuit 142 can be configured to implement MAC operations based on the set of input feature elements and the set of discretized weights to compute an influence that each input feature element of the set of input feature elements has on one of the output feature elements responsive to a compute command. The compute command can be issued by the control unit 118 based on the convolution layer instructions 112. The MAC circuit 142 can be configured to ternary multiply each input feature element by a respective discretized weight of the set of discretized weights.

The MAC circuit 142 can be configured to add a product of the ternary multiplication to the value representative of a respective output feature element of the set of output feature elements at the first destination register. The ALU 136 can be configured to implement ternary multiplication in parallel. For example, the MAC circuit 142 is configured to ternary multiply in parallel each input feature element by a respective discretized weight, and add each product to a respective value representative of a respective output feature element of the set of output feature elements at the first destination register. Thus, the ALU 136 can be configured to implement MAC operations in parallel to compute the influence that each input feature element of the set of input feature elements has on one of the output feature elements based on the respective discretized weight of the set of weights.

For example, the convolution layer instructions 112 are multi-cycle instructions that can perform MAC operations over a k number of clock cycles to compute an influence that each input feature element of the set of input feature elements has on an output feature element of a set of output feature elements of two or more feature maps based on the respective discretized weight of the set of weights stored at the first source register. For example, the ALU 136 includes multiple MAC circuits that can be configured to compute an influence that each input feature element of the set of input feature elements has on the output feature element of the set of output feature elements based on the respective discretized weight of the set of weights. For example, the MAC circuit 142 includes a first MAC circuit and a second MAC circuit. Each of the first and second MAC circuits can be configured to compute in a single clock cycle (e.g., k=1) the influence that each input feature element of the set of input feature elements has on the output feature element of the set of output feature elements based on the respective discretized weight of the set of weights.

For example, the convolution layer instructions 112 are multi-cycle instructions that can perform MAC operations over one (1) or more clock cycles to compute an influence that each input feature element of first and second set of input feature elements of different input feature maps have on respective output feature element of the set of output feature elements based on a respective discretized weight. For example, during each clock cycle of a multi-cycle instruction, the control unit 118 can be configured to coordinate operations of the register file 134 and the ALU 136 based on the convolution layer instructions 112. The control unit 118 can be configured to command the ALU 136 to update the set of output feature elements to indicate an influence a respective input feature element of the first and second set of input feature elements have on the output feature element of the set of output feature elements based on a respective discretized weight. Accordingly, the control unit 118 can be configured to coordinate operations of the datapath 120 to compute the influence that the first and second set of input feature elements have on output feature elements of respective output feature maps for the convolution layer of the neural network system 102 responsive to the convolution layer instructions 112. By employing the convolution layer instructions 112 for input feature element influence computation for a convolution layer of a neural network system, such as the neural network system 102 reduces an amount of power consumed by the computing system 100 as fewer clock cycles are needed to be executed.

For example, the control unit 118 is configured to control operations of the register file 134 and the ALU 136 based on the fully connected layer instructions 114 to compute an influence that the set of input feature elements of the respective input feature map have on an output feature element of the set of output feature elements of the respective output feature map. For example, the fully connected layer instructions 114 are multi-cycle instructions that can perform MAC operations over a k number of clock cycles to compute an influence that each input feature element of the set of input feature elements has on the output feature element of respective output feature maps based on a respective subset of discretized weights of the set of discretized weights. Thus, the fully connected layer instructions 114 can be programmed to command the control unit 118 to coordinate operations of the datapath 120 to compute the influence that the set of input feature elements of the respective input feature map have on the output feature element of the respective output feature maps for the fully connected layer of the neural network system 102. By employing the fully connected layers instructions 114 to coordinate operations of the datapath 120 for input feature element influence computation for a fully connected layer of a neural network system, such as the neural network system 102 reduces an amount of power consumed by the computing system 100 as fewer clock cycles are needed to be executed.

For example, the convolution layer instructions 112 is configured to command the processor 104 to populate a LUT for computing an influence that the set of input feature elements of the input feature map have on the at least one output feature element of the respective output feature map. The LUT can include a first address column, a second address column, a first LUT value column, and a second LUT value column. Each of the first and second address columns includes 4-bit binary values representative of addresses for respective LUT values in one of the first and second LUT value columns. Each of the first and second LUT value columns includes LUT values that can be computed based on respective logical LUT expressions that can be implemented at the ALU 136. The ALU 136 can be configured to execute the respective logical LUT expressions to calculate the LUT values based on the set of input feature elements responsive to a LUT command issued by the control unit 118 based on the convolution layer instructions 112. For example, the control unit 118 is configured to designate sixteen (16) destination registers of the destination registers 140 of the register file 138 for storing each respective computed LUT value of the first and second LUT value columns responsive to convolution layer instructions 112.

For example, the control unit 118 can be configured to command the first source register to provide the set of input feature elements to the ALU 136 for populating the LUT with LUT values based on the convolution layer instructions 112. For example, the control unit 118 is configured to command the ALU 136 to execute each logical LUT expression based on the set of input feature elements, and store a result of each executed LUT logical expression as a LUT value in one of the sixteen (16) designated destination registers of the destination registers 140. Accordingly, the control unit 118 can be configured to coordinate operations of the register file 134 and the ALU 136 to populate the LUT based on the convolution layer instructions 112.

By way of example, respective logical LUT expressions for computing LUT values of the first and second LUT value columns can exhibit symmetry between each other. Because the respective logical LUT expression for the first and second LUT value columns can exhibit logical symmetry, the ALU 136 can be configured to populate one of the first and second LUT value columns in response to the LUT command. The ALU 136 can be configured to populate a remaining one of the first and second LUT value columns by multiplying the populated LUT value column by "−1" and storing a result of the multiplication in a remaining LUT value column of the LUT. The processor 104 is configured to employ a populated LUT for computing an influence that the set of input feature elements have on the at least one output feature element of the respective output feature map, as described herein.

For example, the register file 134 can store the populated LUT. The register file 134, responsive to a command issued by the control unit 118 based on the convolution layer instructions 112, can be configured to receive discretized weights for input feature elements of the input feature map. The register file 134 can be configured to use the discretized weights as addresses to identify first and second LUT values from the respective LUT values, and update a respective value representative of at least one output feature element of an output feature map to indicate the influence that input feature elements of the input feature map have on at least one output feature element of the output feature map. By employing the populated LUT for computing feature element influence computation, a number of operations implemented by the processor 104 can be reduced, thereby reducing an amount of power consumed by the computing system 100 as fewer clock cycles are needed to be executed.

Figure 2:
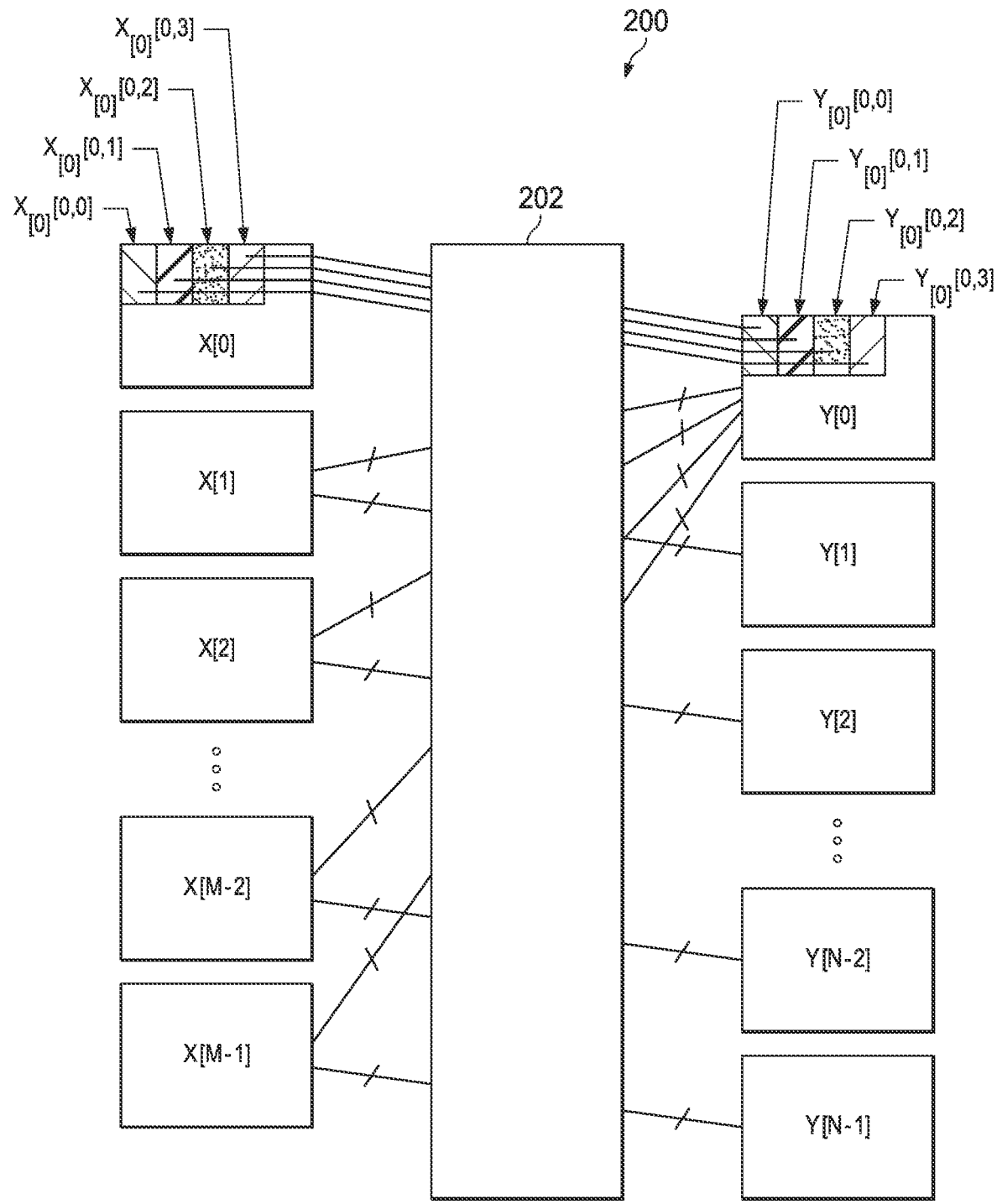
FIG. 2 is an example of a graphical illustration of a convolution layer.

FIG. 2 is an example of a graphical illustration of a convolution layer 200. For example, the convolution layer 200 can be representative of a point-wise convolution layer. The convolution layer 200 can be executed on the computing system 100 to convolve at least one input feature map of a set of input feature maps (labeled as "X[0], X[1], X[2], X[M−2], and X[M−1]" in the example of FIG. 2) with a set of discretized weights A[m,n] from a discretized weight space 202 to emphasize one or more features of the at least one input feature map, wherein M is an integer that is equal to or greater than one (1). The convolution layer 200 can be executed by the processor 104 based on the convolution layer instructions 112 stored in the memory 106. Therefore, the following description of FIG. 2 also refers to FIG. 1.

For example, a feature is a piece of information about a content of an image. For example, the feature is a structure in the image, such as a point (e.g., corner point), edge, or object. Each discretized weight in the discretized weight space 202 can be referred to as A[m,n], wherein [m,n] is a discretized weight location of a respective discretized weight in the discretized weight space 202. Each discretized weight A[m,n] in the discretized weight space 202 can be represented by a contiguous group of binary digits and stored as part of the discretized weight data 110 within the memory 106. For example, each discretized weight A[m,n] in the discretized weight space 202 is of a defined bit size (or length), such as 2-bits or 4-bits. Thus, each discretized weight A[m,n] in the discretized weight space 202 can be one of a binary weight (e.g., 1 and 0), a ternary weight (+1, 0, and −1), or a quaternary weight (e.g., −1, −0, +0, and +2). The set of input feature maps of FIG. 2 can be stored as part of the feature map data 108, and the discretized weight space 202 can be stored as part of the discretized weight data 110 in the memory 106, as shown in FIG. 1. The control unit 118 can be configured to access the memory 106 and execute the convolution layer instructions 112 to process the set of input feature maps based on a set of discretized weights of the discretized weight space 202.

Each input feature map of the set of input feature maps can include a P number of input feature elements $X_{[K]}[i,j]$, wherein P is a number equal to or greater than one, $X_{[K]}$ is a respective input feature map, [i,j] is a feature element location in the respective input feature map. Each input feature element $X_{[K]}[i,j]$ can be represented by a contiguous group of binary digits and stored as part of the feature map data 108 in the memory 106. For example, each input feature element $X_{[K]}[i,j]$ is of a defined bit size (or length), such as 4-bits, 8-bits, or 16-bits. By way example, FIG. 2 shows the input feature map X[0] with a set of input feature elements that includes four (4) input feature elements (labeled as "$X_{[0]}[0,0]$, $X_{[0]}[0,1]$, $X_{[0]}[0,2]$, and $X_{[0]}[0,3]$ in FIG. 2).

For example, the set of input feature maps of FIG. 2 include a similar number of feature elements as the feature map X[0]. While the example of FIG. 2 shows the input feature maps with four (4) input feature elements, in other examples, the input feature maps can include more or less input feature elements. Each input feature map of the set of input feature maps can have a respective map size. The term "map size" as used herein can refer to a dimensionality of a feature map. Thus, a feature map can have a width (W), a height (H), and a depth (D). For clarity and brevity purposes, the feature maps are described herein with a depth of one (1), however, in other examples, feature maps with a greater depth can be processed according to the system and methods described herein.

The convolution layer 200 can be programmed to convolve each input feature map based on the discretized set of weights of the discretized weight space 202 to compute an influence that each input feature element $X_{[K]}[i,j]$ of each input feature map has on at least one output feature element $Y_{[K]}[i,j]$ of a set of output feature maps (labeled as "Y[0], Y[1], Y[2], Y[N−2], and Y[N−1]" in the example of FIG. 2), wherein N is an integer that is equal to or greater than one (1). Each output feature map of the set output feature maps includes output feature elements $Y_{[K]}[i,j]$, wherein $Y_{[K]}$ is a respective output feature map and [i,j] is a feature element location in the respective output feature map. Each output feature element $Y_{[K]}[i,j]$ of each output feature map can be represented by a contiguous group of binary digits and stored as part of the feature map data 108. For example, each output feature element $Y_{[K]}[i,j]$ of each output feature map is of a defined bit size (or length), such as 16-bits. By way of example, the feature map Y[0] includes a set of output feature elements that include four (4) output feature elements (labeled as "$Y_{[0]}[0,0]$, $Y_{[0]}[0,1]$, $Y_{[0]}[0,2]$, and $Y_{[0]}[0,3]$" in the example of FIG. 2). While the example of FIG. 2 shows the output feature maps with four (4) output feature elements, in other examples, the output feature maps can include more or less output feature elements. Each output feature map of the set of output feature maps can have a respective map size.

By way of example, the discretized weight space 202 includes a set of discretized weights that include four (4) discretized weights A[0,0], A[0,1], A[0,2], and A[0,3]. Each discretized weight of the set of discretized weights A[0,0], A[0,1], A[0,2], and A[0,3 can be a ternary weight and can be represented as one of a 01, 10, and 11, in an example, and in other example, as one of 01, 00, and 11. In other examples, the set of discretized weights A[0,0], A[0,1], A[0,2], and A[0,3] can be a different discretized weight (e.g., a binary weight). For clarity and brevity purposes, convolution of the input feature map X[0] based on the set of discretized weights A[0,0], A[0,1], A[0,2], and A[0,3] is described herein for determining an influence that the set of input feature elements $X_{[0]}[0,0]$, $X_{[0]}[0,1]$, $X_{[0]}[0,2]$, and $X_{[0]}[0,3]$ of the feature map X[0] have on a respective output feature element of the set of output feature elements $Y_{[0]}[0,0]$, $Y_{[0]}[0,1]$, $Y_{[0]}[0,2]$, and $Y_{[0]}[0,3]$ of the output feature map X[0]. The influence that input feature elements $X_{[K]}[i,j]$ of the input feature maps X[1], X[2], X[M−2], and X[M−1] have one or more output feature elements $Y_{[K]}[i,j]$ of the output feature maps Y[0], Y[1], Y[2], Y[N−2], and Y[N−1] can be computed in a same or similar manner as described herein. Thus, the influence that respective input feature elements $X_{[K]}[i,j]$ of remaining input feature maps X[2], X[M−2], and X[M−1] have on the output feature elements $Y_{[0]}[i,j]$ of the output feature map Y[0] can be computed in a same or similar manner as described herein with respect to the input feature map X[0].

By way of example, the control unit 118 is configured to load the set of input feature elements $X_{[0]}[0,0]$, $X_{[0]}[0,1]$, $X_{[0]}[0,2]$, and $X_{[0]}[0,3]$ into the first source register of the source registers 138 of the register file 134 based on the convolution layer instructions 112. The control unit 118 can be configured to load the set of discretized weights A[0,0], A[0,1], A[0,2], and A[0,3] into the second source register of the source registers 138 of the register file 134 based on the convolution layer instructions 112. For example, the control unit 118 is configured to load the set of output feature elements $Y_{[0]}[0,0]$, $Y_{[0]}[0,1]$, $Y_{[0]}[0,2]$, and $Y_{[0]}[0,3]$ into a respective destination register of the destination registers 140 of the register file 134. For example, the first and second source registers and the respective destination register are 32-bits. Each of the input feature elements of the set of input feature elements $X_{[0]}[0,0]$, $X_{[0]}[0,1]$, $X_{[0]}[0,2]$, and $X_{[0]}[0,3]$ can be 8-bits, the set of discretized weights A[0,0], A[0,1], A[0,2], and A[0,3] can be 2-bits, and each output feature element of the set of output feature elements can be 8-bits.

The control unit 118 can be configured to command the first source register to provide the set input feature elements $X_{[0]}[0,0]$, $X_{[0]}[0,1]$, $X_{[0]}[0,2]$, and $X_{[0]}[0,3]$ and the second source register to provide the set of discretized weights A[0,0], A[0,1], A[0,2], and A[0,3] to the ALU 136 for convolution based on the convolution layer instructions 112. The MAC circuit 142 of the ALU 136 can be configured to implement ternary multiplication to compute a contribution (e.g., influence) that each input feature element of the set of input feature elements $X_{[0]}[0,0]$, $X_{[0]}[0,1]$, $X_{[0]}[0,2]$, and $X_{[0]}[0,3]$ has on a respective output feature element of the set of output feature elements $Y_{[0]}[0,0]$, $Y_{[0]}[0,1]$, $Y_{[0]}[0,2]$, and $Y_{[0]}[0,3]$ of the output feature map Y[0] based on a respective discretized weight of the set of discretized weights A[0,0], A[0,1], A[0,2], and A[0,3]. The MAC circuit 142 can be configured to add a result of each contribution to the respective destination register to update a binary value stored therein representative of the respective output feature element $Y_{[0]}[0,0]$, $Y_{[0]}[0,1]$, $Y_{[0]}[0,2]$, and $Y_{[0]}[0,3]$ of the output feature map Y[0].

For example, the MAC circuit 142 is configured to ternary multiply the input feature element $X_{[0]}[0,0]$ (e.g., an 8-bit input feature element) by the discretized weight A[0,0] (e.g., a 2-bit ternary weight) and add (e.g., ternary accumulate) a product of the ternary multiplication to a value representative of the output feature element $Y_{[0]}[0,0]$ at a first destination register of the destination registers 140. The MAC circuit 142 can be configured to ternary multiply the input feature element $X_{[0]}[0,1]$ (e.g., an 8-bit input feature element) by the discretized weight A[0,0] (e.g., a 2-bit ternary weight) and add (e.g., ternary accumulate) a product of the ternary multiplication to a value representative of the output feature element $Y_{[0]}[0,1]$ at a second destination register of the destination registers 140. The MAC circuit 142 can be configured to ternary multiply the input feature element $X_{[0]}[0,2]$ (e.g., an 8-bit input feature element) by the discretized weight A[0,0] (e.g., a 2-bit ternary weight) and add (e.g., ternary accumulate) a product of the ternary multiplication to a value representative of the output feature element $Y_{[0]}[0,2]$ at a third destination register of the destination registers 140. The MAC circuit 142 can be configured to ternary multiply the input feature element $X_{[0]}[0,3]$ (e.g., an 8-bit input feature element) by the discretized weight A[0,0] (e.g., a 2-bit ternary weight) and add (e.g., ternary accumulate) a product of the ternary multiplication to a value representative of the output feature element $Y_{[0]}[0,3]$ at a fourth destination register of the destination registers 140.

The control unit 118 can be configured to coordinate operations of the datapath 120 according to the convolution layer instructions 112 to determine an influence that the input feature elements $X_{[0]}[0,0]$, $X_{[0]}[0,1]$, $X_{[0]}[0,2]$, and $X_{[0]}[0,3]$ have on respective output feature elements of other output feature maps Y[1], Y[2], Y[N−2], and Y[N−1] based on a respective remaining discretized weight A[0,1], A[0,2], and A[0,3] in a same or similar manner as described herein. Accordingly, the convolution layer instructions 112 can be programmed to command the processor 104 to process input feature elements $X_{[K]}[i,j]$ of input feature maps X[0], X[1], X[2], X[M−2], and X[M−1] using MAC operations to compute an influence that each discretized weight A[m,n] of the set of discretized weights has on a respective output feature element $Y_{[K]}[i,j]$ of each output feature map Y[0], Y[1], Y[2], Y[N−2], and Y[N−1].

FIG. 3 is an example of a computer instruction 300. For example, the computer instruction 300 has an instruction format that can be based on an ISA of a processor, such as the processor 104, as shown in FIG. 1. Therefore, the following description of FIG. 3 also refers to FIG. 1. For example, the processor 104 is a RISC-type processor, and the computer instruction 300 is an R-instruction. The R-instruction can be 32-bits, wherein a first grouping of seven (7) bits can represent an instruction opcode (labeled as "opcode" in FIG. 3), a second grouping of seven (7) bits can represent an additional opcode (labeled as "funct7" in FIG. 3), a first grouping of five (5) bits can represent an address for a first source register (labeled as "rs1" in FIG. 3) of the source registers 138, a second grouping of five (5) bits can represent an address for a second source register (labeled as "rs2" in FIG. 3) of the source registers 138, a third grouping of five (5) bits can represent an address for a destination register (labeled as "rsd" in FIG. 3) of the destination registers 140, and three (3) bits of the R-instruction can represent an addition opcode or a bit shift amount (labeled as "funct3" in FIG. 3). For example, the coded instructions representing the neural network system 102 stored in the memory 106 have an instruction format similar to the instruction 300. The coded instructions can be compiled (e.g., by a compiler) based on a pseudocode representation of the neural network system 102 and executed by the function 104 to implement at least some of the functions described herein.

FIG. 4 is an example of a portion of pseudocode 400 of a neural network system, such as the neural network system 102, as shown in FIG. 1. Therefore, the following description of FIG. 4 also refers to FIG. 1-3. The pseudocode 400 can be a high-level language code representation of at least some of the convolution layer instructions 112 of the neural network system 102, as shown in FIG. 1. The pseudocode 400 can be a multi-cycle instruction that can perform MAC operations over a k number of clock cycles to compute an influence that a respective input feature element of input feature maps can have on one or more output feature elements of one or more output feature maps based on a set discretized weights of a discretized weight space (e.g., the discretized weight space 202, as shown in FIG. 2).

For example, the pseudocode 400 in the example of FIG. 4 is implemented over eight (8) clock cycles. For example, the datapath 120 of the processor 104 is configured to support 16-bit add/sub-operations to implement MAC operations. For example, the ALU 136 can be configured to support four (4) MAC operations per clock cycle. Because the pseudocode 400 is a multi-cycle instruction and the datapath 120 of the processor 104 supports four (4) 16-bit add/sub-operations, the ALU 136 can be configured to perform MAC operations over eight (8) clock cycles to update thirty-two (32) output values representative of output feature elements of respective output feature maps at the destination registers 140. For example, the datapath 120 is configured to support two (2) 16-bit add/sub-operations to implement MAC operations. For example, the ALU 136 is configured to support two (2) MAC operations per each clock cycle, such that the ALU 136 is configured to perform MAC operations over sixteen (16) clock cycles to update the thirty-two (32) output values representative of the output feature elements of the respective output feature maps at the destination registers 140. For example, the datapath 120 is configured to support sixteen (16) 16-bit add/sub-operations to implement MAC operations. For example, the ALU 136 is configured to support sixteen (16) MAC operations per each clock cycle, such that the ALU 136 is configured to perform MAC operations over two (2) clock cycles to update the thirty-two (32) output values representative of the output feature elements of the respective output feature maps at the destination registers 140. For example, the datapath 120 can be configured to support thirty-two (32) 16-bit add/sub-operations to implement MAC operations. Thus, the ALU 136 can be configured to perform thirty-two (32) MAC operations in a single clock cycle to update the thirty-two (32) output values representative of the output feature elements of the respective output feature maps at the destination registers 140.

Figure 5:
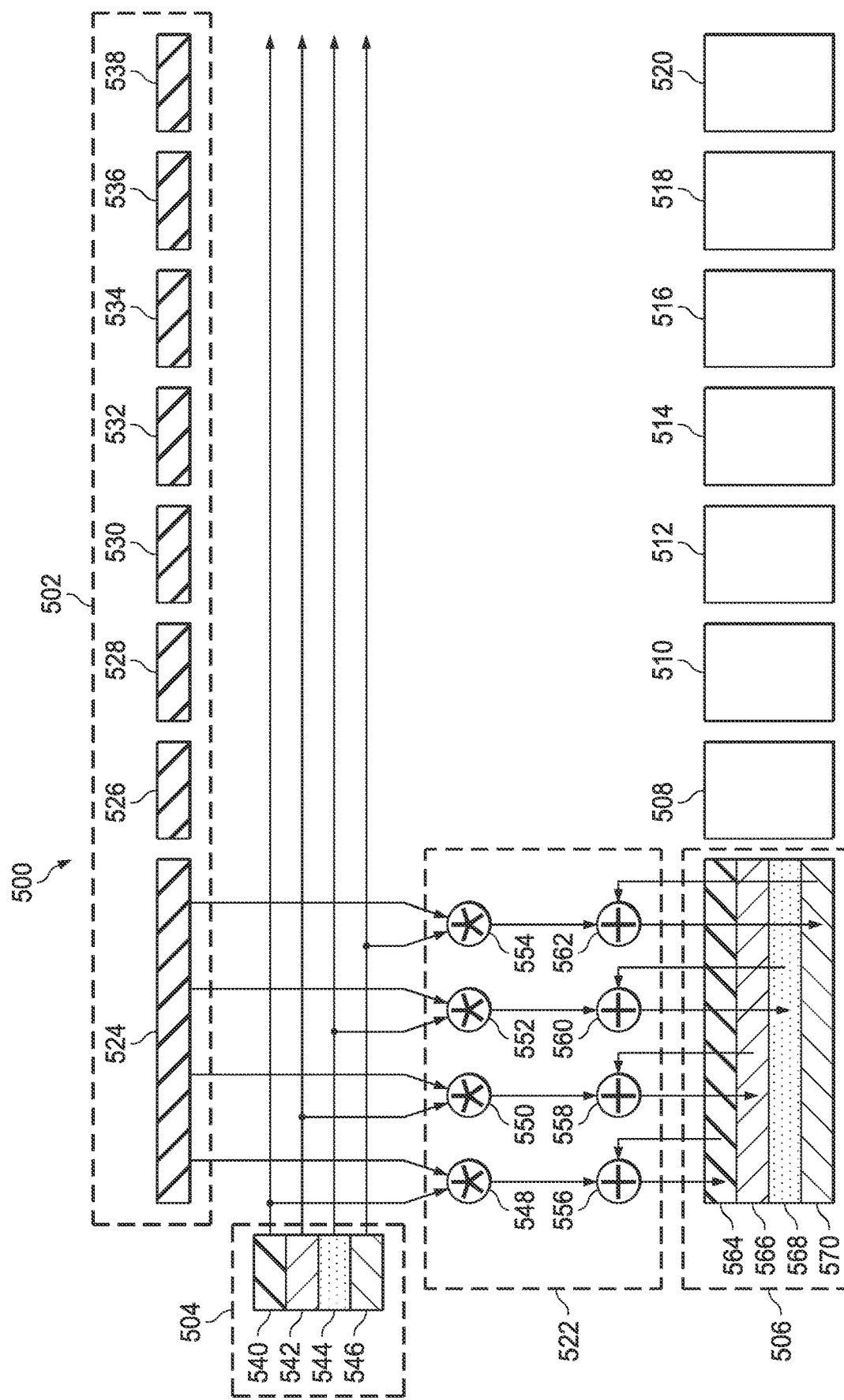
FIG. 5 is an example of a portion of a datapath configured to implement convolution computations.

FIG. 5 is an example of a portion of a datapath 500 configured to implement convolution computations. For example, the datapath 500 is the datapath 120, as shown in FIG. 1. Therefore, the following description of FIG. 5 also refers to FIGS. 1-4. As shown in the example of FIG. 5, the datapath 500 can include a first source register 502, a second source register 504, destination register sets 506, 508, 510, 512, 514, 516, 518, 520, and a MAC circuit 522. The source registers 138 can include the first and second source registers 502 and 504, as shown in FIG. 1. For example, the destination registers 140 can include the destination register sets 506, 508, 510, 512, 514, 516, 518, 520. Thus, for example, the destination register sets 506, 508, 510, 512, 514, 516, 518, 520 can be respective subsets of destination registers of the destination registers 140, as shown in FIG. 1. By way of example, each destination register set 506, 508, 510, 512, 514, 516, 518, 520 includes a first, a second, a third, and a fourth destination register. For example, the first and second source registers 502 and 504, and each destination register of the destination register sets 506, 508, 510, 512, 514, 516, 518, 520 are 32-bits. For example, the MAC circuit 522 is the MAC circuit 142, as shown in FIG. 1.

For example, the control unit 118 is configured to control operations of the datapath 500 to convolve a set of input feature elements of an input feature map with a set of discretized weights over a k number of clock cycles using MAC operations based on the convolution layer instructions 112. During each clock cycle, the control unit 118 is configured to command the datapath 500 to convolve the set of input feature elements of the input feature map with a respective discretized weight of the set of discretized weights. Thus, a contribution of each input feature element of the set of input feature elements to a set of output feature elements of respective output feature maps can be computed and stored at the sets of destination registers 506, 508, 510, 512, 514, 516.

The convolution layer instructions 112 can be executed over the k number of clock cycles for each set of input feature elements of a respective input feature map to convolve each set of input feature elements with a respective set of discretized weights using MAC operations. By way of example, in the example of FIG. 5, the convolution layer instructions 112 are implemented over k=8 clock cycles. During each clock cycle, the control unit 118 can be configured to coordinate operations of the datapath 500 based on the convolution layer instructions 112. Accordingly, the control unit 118 can be configured to coordinate operations of the datapath 500 to update the set of output feature elements in the respective output feature maps to indicate an influence a respective input feature element of the set of input feature elements has on a respective output feature element of the set of output feature elements based on a respective discretized weight, as described herein.

The control unit 118 is configured to load a set of discretized weights of a discretized weight space (e.g., the discretized weight space 202, as shown in FIG. 2) based on the convolution layer instructions 112. Thus, as shown in FIG. 5, the first source register 502 can include eight (8) discretized weights 524, 526, 528, 530, 532, 534, 536, and 538 that are each 2-bits wide. By way of example, the control unit 118 is configured to load a set of input feature elements of a respective input feature map into the second source register 504 based on the convolution layer instructions 112. Thus, as shown in FIG. 5, the second source register 504 can include input feature elements 540, 542, 544, and 546 that are 8-bits wide. Each input feature element of the set of input feature elements can be 8-bits and each discretized weight of the set of discretized weights can be 2-bits. For example, each discretized weight is a 2-bit ternary weight or 2-bit binary weight.

The MAC circuit 522 can include ternary circuits 548, 550, 552, and 554 and adder circuits 556, 558, 560, and 562. For example, during a first clock cycle (e.g., k=1) of the k=8 clock cycles, each of the ternary circuits 548, 550, 552, and 554 can be configured to receive one of the input feature elements 540, 542, 544, and 546, and the discretized weight 524. Each of the ternary circuits 548, 550, 552, and 554 can be configured to ternary multiply a respective input feature element of the set of input feature elements 540, 542, 544, and 546 by the discretized weight 524 to generate a product. For example, the ternary circuits 548, 550, 552, and 554 are configured to implement ternary multiplication in parallel. As such, for example, the MAC circuit 522 is configured to support four (4) 16-bit add/sub-operations during a clock cycle to compute the product based on a respective input feature element of the set of input feature elements 540, 542, 544, and 546, and the discretized weight 524. Thus, during the first clock cycle, products can be computed in parallel and provided to respective adder circuits 556, 558, 560, and 562 of the MAC circuit 522.

For example, the control unit 118 is configured to load a set of output feature elements of a respective output feature map into the destination register set 506. Thus, as shown in FIG. 5, the first, second, third, and fourth destination registers of the destination register set 506 includes respective output feature elements 564, 566, 568, and 570 that are 8-bits wide. For example, during the first clock cycle, the control unit 118 is configured to command the adder circuit 556, 558, 560, and 562 to add a value representative of one of the output feature elements 564, 566, 568, and 570 at the destination register set 506. The adder circuit 556, 558, 560, and 562 can be configured to store a result of each addition back at a respective destination register of the first, second, third, and fourth destination registers of the destination register set 506. Accordingly, the MAC circuit 522 can be configured to ternary multiply each input feature element 540, 542, 544, and 546 by the discretized weight 524, add the product of the ternary multiplication to the value representative of one of the output feature elements 564, 566, 568, and 570, and store a result of the addition in the respective destination register. As such, the output feature elements 564, 566, 568, and 570 can be updated to indicate an influence that each input feature element 540, 542, 544, and 546 has on one of the output feature elements 564, 566, 568, and 570 based on the discretized weight 524.

For example, the control unit 118 is configured to load a second set of output feature elements of a second output feature map into the destination register set 508. The destination register set 508 can include a first, a second, a third, and a fourth destination register. During a second clock cycle (e.g., k=2), the control unit 118 can be configured to command the MAC circuit 522 to ternary multiply each of the input feature elements 540, 542, 544, and 546 by the discretized weight 526 and add a product of the ternary multiplication to a value representative of one of the output feature elements of the second set of output feature elements. The control unit 118 is configured to command the MAC circuit 522 to store a result of the addition in a respective destination register of the first, second, third, and fourth destination registers of the destination register set 508.

During remaining clock cycles for the k number of clock cycles (e.g., k=3 to k=8), the control unit 118 can coordinate operations of the datapath 500 to process the input feature elements 540, 542, 544, and 546 based on a remaining discretized weight 528, 530, 532, 534, 536, 538. Each remaining destination register set 510, 512, 514, 516, 518, and 520 can be configured similar to one of the destination register sets 506 and 508. Thus, each remaining destination register set 510, 512, 514, 516, 518, and 520 can include first, second, third, and fourth destination registers. During each remaining clock cycle, the control unit 118 can load a set of output feature elements from another output feature map into one of the first, second, third, and fourth destination registers of the remaining destination register sets 510, 512, 514, 516, 518, and 520 based on the convolution layer instructions 112. During each remaining clock cycle, the control unit 118 can be configured to command the MAC circuit 522 to compute the influence that the input feature elements 540, 542, 544, and 546 have on a respective output feature element of the set of output feature elements at one of the remaining destination register sets 510, 512, 514, 516, 518, and 520.

Therefore, during each clock cycle over a k number of clock cycles, the control unit 118 can be configured to command the MAC circuit 522 to update each set of output feature elements of respective output future maps being stored at the destination register sets 506, 508, 510, 512, 514, 516, 518, 520. As such, an influence that each input feature element of the set of input feature elements 540, 542, 546, and 548 has on a respective output feature element of the set of output feature elements of respective output future maps stored at one of the destination register sets 506, 508, 510, 512, 514, 516, 518, 520 can be computed based on a respective discretized weight of the set of discretized weights 524, 526, 528, 530, 532, 534, 536, and 538.

Accordingly, the control unit 118 can be configured to coordinate operations of the datapath 500 for simultaneous processing of the input feature elements 540, 542, 544, and 546 during each clock cycle over a k number of clock cycles responsive to the convolution layer instructions 112, such that the influence of the input set of feature elements 540, 542, 544, and 546 feature elements on the respective output feature element of the set of output feature elements of the respective output future maps can be computed efficiently.

Figure 6:
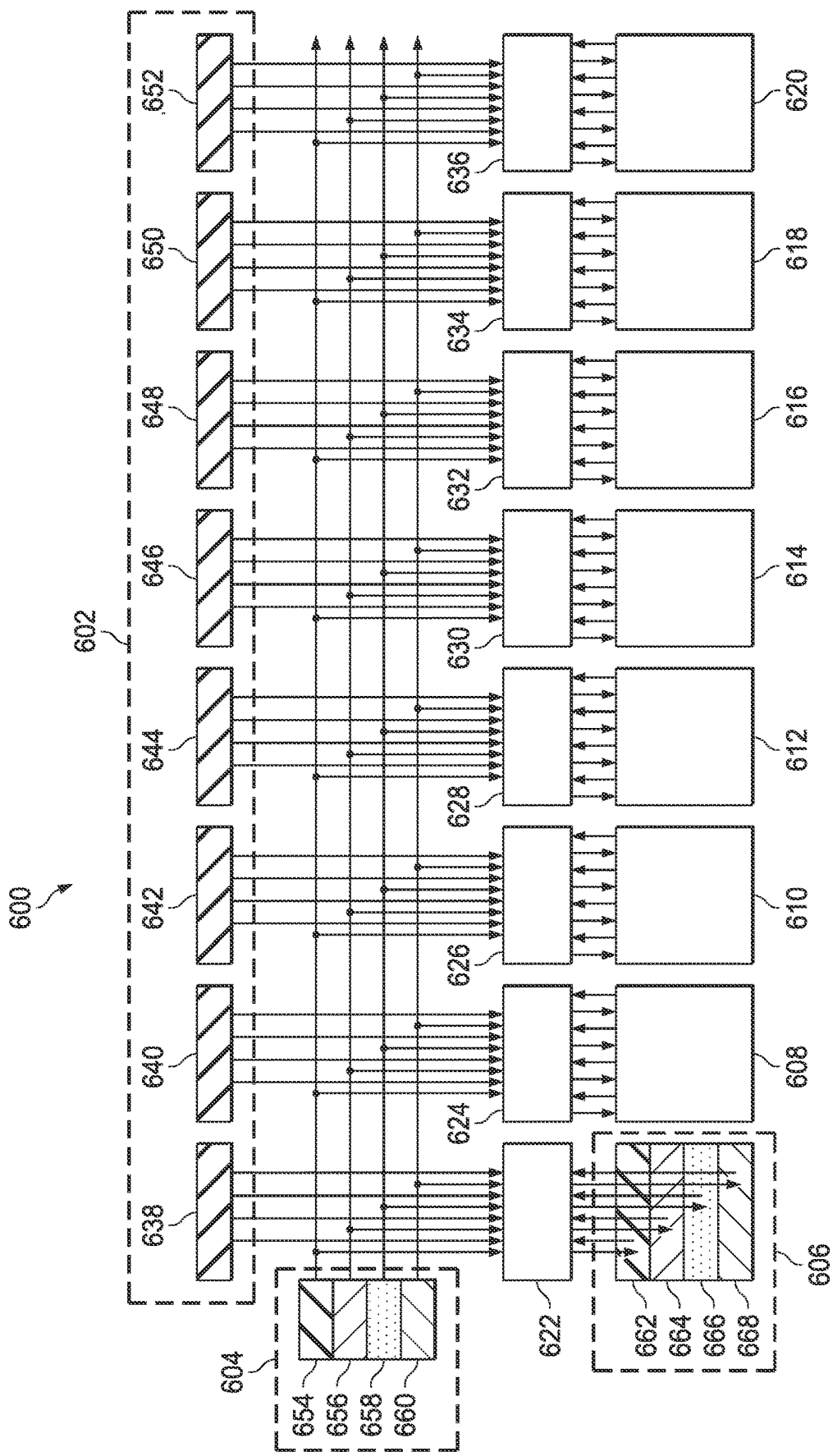
FIG. 6 is another example of a portion of a datapath configured to implement convolution computations.

FIG. 6 is another example of a portion of a datapath 600 configured to implement convolution computations. For example, the datapath 600 is datapath 120, as shown in FIG. 1. Therefore, the following description of FIG. 6 also refers to FIGS. 1-5. For example, the datapath 600 is configured to support single instruction, multiple data (SIMD) operations. As shown in the example of FIG. 6, the datapath 600 can include a first source register 602, a second source register 604, destination register sets 606, 608, 610, 612, 614, 616, 618, 620, and MAC circuits 622, 624, 626, 628, 630, 632, 634, and 636. The source registers 138 can include the first and second source registers 602 and 604, and the destination registers 140 can include the destination register sets 606, 608, 610, 612, 614, 616, 618, 620, as shown in FIG. 1. Thus, For example, the destination register sets 606, 608, 610, 612, 614, 616, 618, 620 can be respective subsets of destination registers of the destination registers 140, as shown in FIG. 1. By way of example, each destination register set 606, 608, 610, 612, 614, 616, 618, 620 can include a first, a second, a third, and a fourth destination register. For example, the first and second source registers 602 and 604, each destination register of each destination register set 606, 608, 610, 612, 614, 616, 618, 620 are each 32-bits. Each MAC circuit 622, 624, 626, 628, 630, 632, 634, and 636 can be configured similarly to the MAC circuit 522, as shown in FIG. 5. Thus, each MAC circuit 622, 624, 626, 628, 630, 632, 634, and 636 can be implemented as combinational digital circuits that can perform ternary multiplication and addition operations. The MAC circuits 622, 624, 626, 628, 630, 632, 634, and 636 can be implemented as part of the ALU 136, as shown in FIG. 1.

Because the datapath 600 supports SIMD operations, For example, the convolution layer instructions 112 instruct the control unit 118 to coordinate simultaneous convolutions of an input feature map with respective discretized weights using MAC operations. Moreover, because the datapath 600 employs eight (8) MAC circuits 622, 624, 626, 628, 630, 632, 634, and 636, the datapath 600 can support 32 16-bit add/sub-operations during a clock cycle. As such, the control unit 118 can be configured to coordinate operations of the datapath 600 to compute an influence that a set of input feature elements of the input feature map have on output feature elements in respective output feature maps over a single clock cycle based on the convolution layer instructions 112.

The control unit 118 can be configured to load a set of discretized weights of a discretized weight space (e.g., the discretized weight space 202, as shown in FIG. 2) into the first source register 602 based on the convolution layer instructions 112. Thus, as shown in FIG. 5, the first source register 502 can include eight (8) discretized weights 638, 640, 642, 644, 646, 648, 650, and 652 that are 2-bits wide. By way of example, the control unit 118 is configured to load a set of input feature elements of a respective input feature map into the second source register 604 based on the convolution layer instructions 112. Thus, as shown in FIG. 6, the second source register 604 can include input feature elements 654, 656, 658, and 660 that are 8-bits wide. Each input feature element of the set of input feature elements can be 8-bits and each discretized weight of the set of discretized weights can be 2-bits. For example, each discretized weight is a 2-bit tertiary weight or 2-bit binary weight.

Because eight (8) sets of discretized weights are load into the first source register 602 and the datapath 600 supports SIMD operations, an influence of each of the set of input feature elements 654, 656, 658, and 660 based on one of the discretized weights 638, 640, 642, 644, 646, 648, 650, and 652 on respective output feature elements of the respective output feature maps can be computed in parallel. Moreover, because the first source register 602 stores eight (8) sets of discretized weights, the influence of the set of input feature elements 654, 656, 658, and 660 on the respective output feature elements of eight (8) output feature maps can be computed in parallel.

For example, the control unit 118 is configured to the first source register 602 to provide a respective discretized weight of the set of discretized weights 638, 640, 642, 644, 646, 648, 650, and 652 to a respective one of the MAC circuits 622, 624, 626, 628, 630, 632, 634, and 636 based on the convolution layer instructions 112. The control unit 118 is configured to the second source register 604 to provide the set of input feature elements 654, 656, 658, and 660 to the respective one of the MAC circuits 622, 624, 626, 628, 630, 632, 634, and 636 based on the convolution layer instructions 112. Each MAC circuit 622, 624, 626, 628, 630, 632, 634, and 636 can be configured to ternary multiply each input feature element 654, 656, 658, and 660 by the respective discretized weight of the set of discretized weights 638, 640, 642, 644, 646, 648, 650, and 652. Each MAC circuit 622, 624, 626, 628, 630, 632, 634, and 636 can be configured to add a product of each ternary multiplication to a respective output feature element of a set of output feature elements of a respective output feature map stored at one of the destination register sets 606, 608, 610, 612, 614, 616, 618, 620.

By way of example, the destination register 606 includes a set of output feature elements 662, 664, 666, and 668 of a respective output feature map. Each of the output feature elements 662, 664, 666, and 668 can be 16-bits and stored at one of the first, second, third, and fourth destination registers of the destination register set 606. The MAC circuit 622 can be configured to ternary multiply each input feature element 654, 656, 658, and 660 by the discretized weight 638 to compute the influence that the set of input feature elements 654, 656, 658, and 660 have on one of the output feature elements of the set of output feature elements 662, 664, 666, and 668 of the respective output feature map. The MAC circuit 622 can be configured to add the product of the ternary multiplication to a binary value representing a respective output feature element of the set of output feature elements 662, 664, 666, and 668 at one of the first, second, third, and fourth destination registers of the destination register set 606. For example, the MAC circuit 622 is configured to add the product based on the input feature element 654 and the discretized weight 638 to the binary value representing the output feature element 662 at the first destination register of the destination register set 606. The MAC circuit 622 can be configured to implement ternary multiplication and addition of products for each output feature element 662, 664, 666, and 668 in parallel. The influence that the input feature elements 654, 656, 658, and 660 have on one of the respective output feature elements within remaining destination register sets 608, 610, 612, 614, 616, 618, 620 based on a respective remaining discretized weight 640, 642, 644, 646, 648, 650, and 652 can be computed by the remaining MAC circuits 624, 626, 628, 630, 632, 634, and 636 in a same or similar manner as described herein.

Accordingly, the control unit 118 can be configured to coordinate operations of the datapath 600 for simultaneous processing of the input feature elements 654, 656, 658, and 660 based on the convolution layer instructions 112, such that the influence of the input feature elements 654, 656, 658 and 660 on the respective output feature elements of the respective output feature maps stored at one of the sets of destination registers 606, 608, 610, 612, 614, 616, 618, 620 can be computed efficiently.

FIG. 7 is an example of pseudocode 700 of convolution operations performed in a neural network system, such as the neural network system 102, as shown in FIG. 1. Therefore, the following description of FIG. 7 also refers to FIGS. 1-2. For example, the pseudocode 700 is a high-level language code (e.g., human-readable code) representation of a portion of the convolution layer instructions 112 of the neural network system 102. The pseudocode 700 can be a multi-cycle instruction that can perform MAC operations over a k number of clock cycles to perform feature element influence computations. For example, the pseudocode 700 is implemented over four (k=4) clock cycles. During each clock cycle, an influence of a first set of input feature elements of a first input feature map and a second set of input feature elements of a second input feature map on a set of output feature elements of a respective output feature map can be computed. For example, during each clock cycle for four (4) clock cycles, the influence of the first and second set of input feature elements on a set of output feature elements of four (4) output feature maps is computed based on a set of discretized weights.

For example, the datapath 120 of the processor 104 is configured to support eight (8) 16-bit add/sub-operations to implement MAC operations. For example, the ALU 136 of the processor 104 can be configured to support eight (8) ternary operations per each clock cycle. Because the pseudocode 700 is a multi-cycle instruction and the datapath 120 can support eight (8) 16-bit add/sub-operations, MAC operations can be performed over four (4) cycles to update thirty-two (32) output values representative of output feature elements of respective output feature maps at the destination registers 140. For example, the datapath 120 is configured to support four (4) 16-bit add/sub-operations to implement MAC operations. For example, the ALU 136 is configured to support four (4) MAC operations per each clock cycle, such that the datapath 120 is configured to perform MAC operations over eight (8) clock cycles to update the thirty-two (32) output values representative of the output feature elements of the respective output feature maps at the destination registers 140. For example, the datapath 120 is configured to support sixteen (16) 16-bit add/sub-operations to implement MAC operations. For example, the ALU 136 is configured to support sixteen (16) ternary operations, such that the datapath 120 is configured to perform MAC operations over two (2) cycles (e.g., k=2) to update the thirty-two (32) output values representative of the output feature elements of the respective output feature maps at the destination registers 140. For example, the datapath 120 is configured to support thirty-two (32) 32-bit add/sub-operations to implement the MAC operations. For example, the ALU 136 is configured to support thirty-two (32) ternary operations, such that the datapath 120 is configured to perform MAC operations over a single clock cycle (e.g., k=1) to update the thirty-two (32) output values representative of the output feature elements of the respective output feature maps at the destination registers 140.

Figure 8:
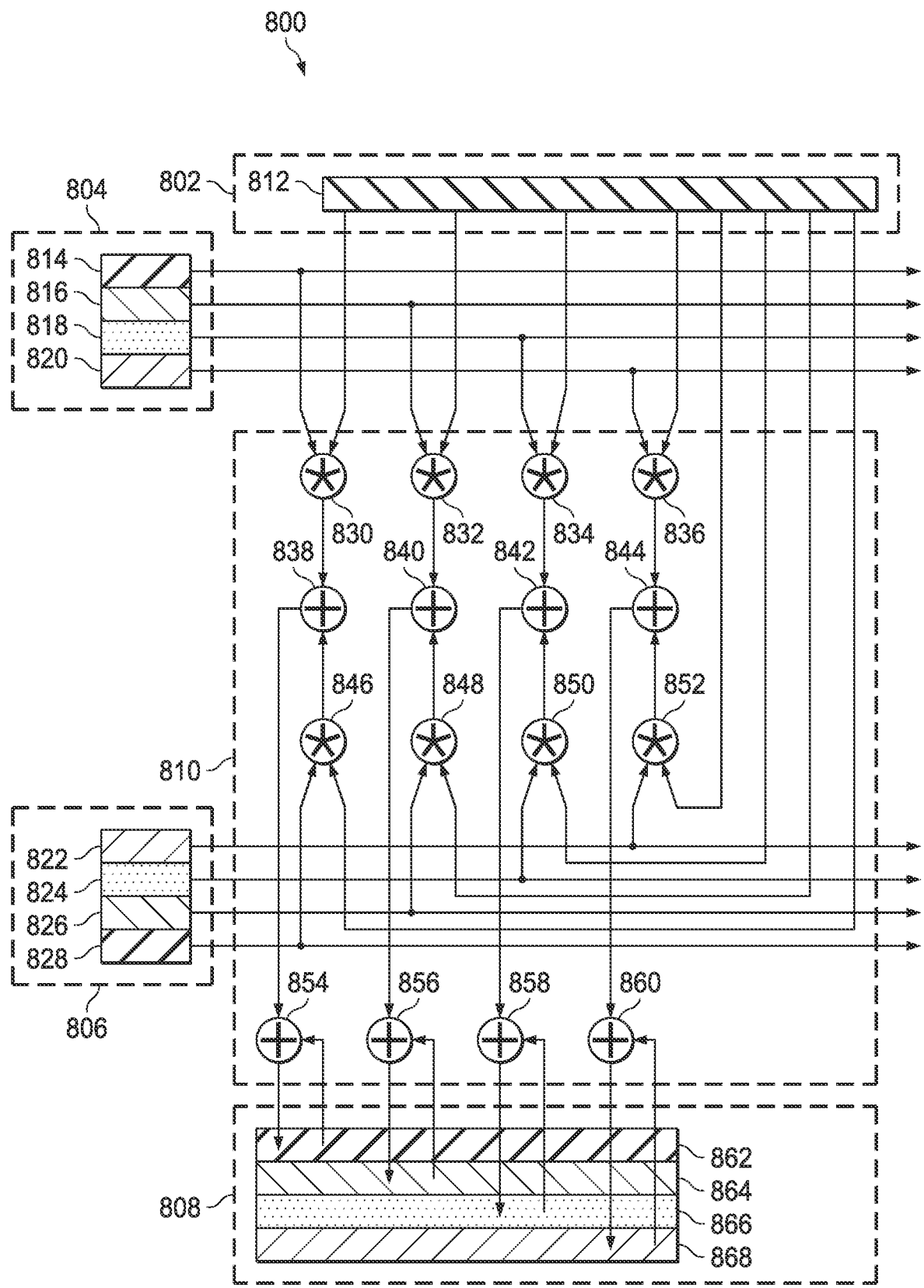
FIG. 8 is a further example of a portion of a datapath configured to implement convolution computations.

FIG. 8 is another example of a portion of a datapath 800 configured to implement convolution computations. For example, the datapath 800 is the datapath 120, as shown in FIG. 1. Therefore, the following description of FIG. 8 also refers to FIGS. 1-2 and 7. As shown in the example of FIG. 8, the datapath 800 can include a first source register 802, a second source register 804, a third source register 806, and a destination register set 808. The datapath 800 can include a MAC circuit 810. The source registers 138 can include the first, second, and third source registers 802, 804, 806 and the destination registers 140 can include the destination register set 808, as shown in FIG. 1. Thus, for example, the destination register set 808 can be a subset of destination registers of the destination registers 140, as shown in FIG. 1. By way of example, the destination register set 808 can include a first, a second, a third, and a fourth destination register. For example, the first, second, and third source registers 802, 804, and 806, and the first, second, third, and fourth destination registers of the destination register 808 are each 32-bits. The MAC circuit 810 can be implemented as a combinational digital circuit that can perform ternary multiplication and addition operations. For example, the MAC circuit 810 is implemented as part of the ALU 136, and thus is the MAC circuit 142, as shown in FIG. 1.

The control unit 118 can be configured to control operations of the datapath 800 to compute an influence that each of a first set of input feature elements of a first input feature map, and a second set of input feature elements of a second input feature map have on a set of output feature elements of a respective output feature map based on the convolution layer instructions 112. For example, the convolution layer instructions 112 are multi-cycle instructions that can perform MAC operations over a k number of clock cycles to compute an influence that each input feature element of the first and second set of input feature elements has on a respective output feature element of the set of output feature elements of the respective output feature map based on a respective discretized weight. By way of example, in the example of FIG. 8, the convolution layer instructions 112 are implemented over k=4 clock cycles. During each clock cycle, the control unit 118 can be configured to coordinate operations of the datapath 800 based on the convolution layer instructions 112. Accordingly, the control unit 118 can be configured to coordinate operations of the datapath 800 to update the set of output feature elements in the output feature map to indicate an influence a respective input feature element from the first and second set of input feature elements has on one of the output feature elements of the set of output feature elements based on a respective discretized weight, as described herein.

The control unit 118 can be configured to load the set of discretized weights of a discretized weight space (e.g., the discretized weight space 202, as shown in FIG. 2) into the first source register 802 based on the convolution layer instructions 112. Thus, as shown in FIG. 5, the first source register 802 can include discretized weight 812 that is 2-bits wide. While the example of FIG. 5 illustrates a single discretized weight 812 at the first source register 802 it is to be understood that the first source register 802 can include a number of discretized weights, such as eight (8) 2-bit discretized weights, wherein the discretized weight 812 is one of the eight (8) 2-bit discretized weights. By way of example, the control unit 118 is configured to load the first set of input feature elements of the first input feature map and the second set of input feature elements of the second input feature map into one of the second and third source registers 804 and 806 based on the convolution layer instructions 112. Thus, as shown in FIG. 8, the second source register 804 includes input feature elements 814, 816, 818, and 820, and the third source register 806 includes input feature elements 822, 824, 826, and 828. Each input feature element of the first and second set of input feature elements can be 8-bits and each discretized weight of the set of discretized weights can be 2-bits. For example, each discretized weight is a 2-bit ternary weight or 2-bit binary weight.

For example, during a first clock cycle (e.g., k=1), the control unit 118 is configured to command the first source register 802 to provide the discretized weight 812 to the MAC circuit 810 based on the convolution layer instructions 112. The control unit 118 is configured to command the second and third source registers 804 and 806 to provide the first and second set of input feature elements 814, 816, 818, 820, 822, 824, 826, and 828 to the MAC circuit 810 based on the convolution layer instructions. The MAC circuit 810 can include a first set of ternary circuits 830, 832, 834, and 836 and a first set of adder circuits 838, 840, 842, and 844. Each ternary circuit of the first set of ternary circuits 830, 832, 834, and 836 can be configured to receive a respective input feature element of the set of input feature elements 814, 816, 818, and 820, and the discretized weight 812. Each ternary circuit of the first set of ternary circuits 830, 832, 834, and 836 can be configured to ternary multiply the respective feature element of the set of input feature elements 814, 816, 818, and 820 by the discretized weight 812 to generate a respective product.

For example, the MAC circuit 810 includes a second set of ternary circuits 846, 848, 850, and 852, and a second set of adder circuits 854, 856, 858, 860. Each ternary circuit of the second set of ternary circuits 846, 848, 850, and 852 can be configured to receive a respective input feature element of the set of input feature elements 822, 824, 826, and 828, and the discretized weight 812. Each ternary circuit of the second set of ternary circuits 846, 848, 850, and 852 can be configured to ternary multiply the respective input feature element of the set of input feature elements 822, 824, 826, and 828 by the discretized weight 812 to generate a respective product. For example, the first and second sets of ternary circuits 830, 832, 834, 836, 846, 848, 850, and 852 can be configured to implement ternary multiplication in parallel. As such, for example, the MAC circuit 810 is configured to support eight (8) 16-bit add/sub-operations to compute the respective product based on a respective input feature element of the set of input feature elements 814, 816, 818, 822, 824, 826, and 828, and further based on the discretized weight 812. Thus, during the first clock cycle, products can be computed in parallel and provided to respective adder logical circuits 838, 840, 842, 844, 854, 856, 858, 860.

For example, the control unit 118 is configured to load a set of output feature elements of a respective output feature map into one of the first, second, third, and fourth destination registers of the destination register set 808 based on the convolution layer instructions 112. Thus, as shown in FIG. 8, the destination register set 808 includes output feature elements 862, 864, 866, and 868. Each of the output feature elements 862, 864, 866, and 868 can be 16-bits. For example, during the first clock cycle, the control unit 118 is configured to command the first, second, third, and fourth destination registers of the destination register set 808 to provide each binary value representing one of the output feature elements 862, 864, 866, and 868 stored therein to the MAC circuit 810.

For example, during the first clock cycle, the MAC circuit 810 is configured to add each respective product to one of the binary values representing a respective output feature element of the set of output feature elements 862, 864, 866, and 868. For example, the first set of adder circuits 838, 840, 842, 844 is configured to add a product from a respective ternary circuit of the first set of ternary circuits 830, 832, 834, 836 to one of the respective binary values representing one of the output feature elements 862, 864, 866, and 868. For example, during the first clock cycle, a product of each addition by the first set of adder circuits 838, 840, 842, 844 is stored at one of the first, second, third, and fourth destination registers of the destination register set 808 to update respective binary values representing the output feature elements 862, 864, 866, and 868 to indicate an influence of the first set of input feature elements 814, 816, 818, and 820 on a respective output feature element of the set of output feature elements 862, 864, 866, and 868.

For example, during the first clock cycle, the second set of adder circuits 854, 856, 858, and 860 is configured to add a product from a respective ternary circuit of the second set of ternary circuits 846, 848, 850, and 852 to one of the respective binary values representing one of the output feature elements 862, 864, 866, and 868. A product of each addition by the second set of adder circuits 854, 856, 858, and 860 can be stored at the destination register 808 to update the binary values representing the output feature elements 862, 864, 866, and 868 to indicate an influence of the second set of input feature elements 822, 824, 826, and 828 on a respective output feature element of the set of output feature elements 862, 864, 866, and 868. Accordingly, during the first clock cycle, the MAC circuit 810 can be configured to update each of the output feature elements 862, 864, 866, and 868 to indicate an influence that the first set of input feature elements 814, 816, 818, and 820, and the second set of input feature elements 822, 824, 826, and 828 has on a respective output feature element of the set of output feature elements 862, 864, 866, and 868 of the respective output feature map.

For example, during a second clock cycle (e.g., k=2), the control unit 118 is configured to command the first source register 802 to provide a second discretized weight to the MAC circuit 810 based on the convolution layer instructions 112. The output feature elements 862, 864, 866, and 868 can be updated to indicate an influence that each of the first set of input feature elements 814, 816, 818, and 820 and the second set of input feature elements 822, 824, 826, and 828 has on a respective output feature element of the set of output feature elements 862, 864, 866, and 868 based on the second discretized weight. The control unit 118 can be configured to command the first source register 802 to provide subsequent discretized weights stored therein during each subsequent cycle of the k number of clock cycles for updating the output feature elements 862, 864, 866, and 868. During each subsequent clock cycle of the k number of remaining clock cycles, the MAC circuit 810 can be configured to compute an influence that each of the first set of input feature elements 814, 816, 818, and 820 and the second set of input feature elements 822, 824, 826, and 828 has on a respective output feature element of the set of output feature elements 862, 864, 866, and 868 based on one of the subsequent discretized weights.

Accordingly, the control unit 118 can be configured to coordinate operations of the datapath 800 for processing of the first set of input feature elements 814, 816, 818, and 820 and the second set of input feature elements 822, 824, 826, and 828 based on the fully connected layer instructions, such that the influence of the first and second input feature elements 814, 816, 818, and 820, 822, 824, 826, and 828 on a respective output feature element of the set of output feature elements 862, 864, 866, and 868 can be computed efficiently.

Figure 9:
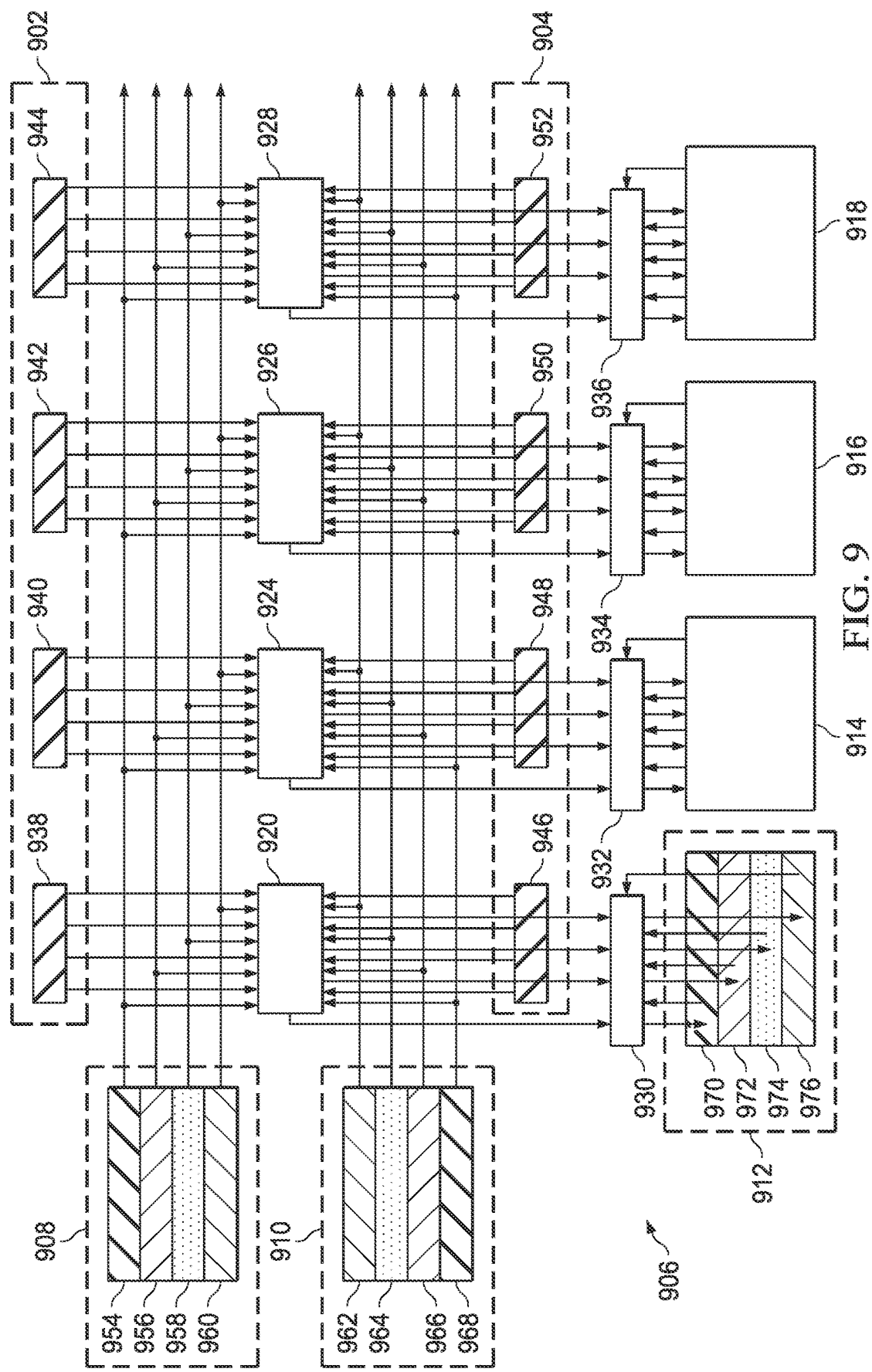
FIG. 9 is yet another example of a portion of a datapath configured to implement convolution computations.

FIG. 9 is yet another example of a portion of a datapath 900 configured to implement convolution computations. For example, the datapath 900 is the datapath 120, as shown in FIG. 1. Therefore, the following description of FIG. 9 also refers to FIGS. 1-2. The datapath 900 can be configured to support SIMD operations. As shown in the example of FIG. 9, the datapath 900 includes a first register portion 902 and a second register portion 904. The first and second register portions 902 can collectively define a first source register 906. As shown in FIG. 9, the first and second register portions 902 and 904 are 8-bits, and thus the first source register 906 is 16-bits. The datapath 900 includes a second source register 908, a third source register 910, and destination register sets 912, 914, 916, and 918. For example, the destination registers 140 can include the destination register sets 912, 914, 916, and 918. Thus, the destination register sets 912, 914, 916, and 918 can be respective subsets of destination registers of the destination registers 140, as shown in FIG. 1. By way of example, each destination register set 912, 914, 916, and 918 can include a first, a second, a third, and a fourth destination register. The source registers 138 can include the first, second, and third source registers 906, 908, and 912, as shown in FIG. 1. For example, the first, second, and third source registers 906, 908, and 912, and the first, second, third, and fourth registers of each destination register set 912, 914, 916, and 918 is 32-bits.

The datapath 900 can include upper functional circuits 920, 924, 926, and 928 and lower functional circuits 930, 932, 934, and 936. Each respective pair of upper and lower functional circuits 920, 924, 926, 928, 930, 932, 934, and 936 can define a respective MAC circuit that can be configured similar to the MAC circuit 810, as shown in FIG. 8. For example, each upper functional circuit 920, 924, 926, and 928 can include the first set of ternary circuits 830, 832, 834, and 836, the first set of adder circuits 838, 840, 842, 844, and the second set of ternary circuits 846, 848, 850, and 852. Each lower functional circuit 930, 932, 934, and 936 can include the second set of adder circuits 854, 856, 858, and 860. Thus, the datapath 900 includes first, second, third, and fourth MAC circuits that can be configured similar to the MAC circuit 810. Each of the first, second, third, and fourth MAC circuits can be implemented as a combinational digital circuit that can perform ternary multiplication and addition operations. For example, each of the first, second, third and fourth MAC circuits are implemented as part of the ALU 136, as shown in FIG. 1.

Because the datapath 900 supports SIMD operations, the convolution layer instructions 112 can instruct the control unit 118 to coordinate simultaneous convolutions of input feature maps with respective discretized weights using MAC operations. Moreover, because the datapath 900 employs eight (8) ternary logical circuits per each of the first, second, third, and fourth MAC circuits, the datapath 900 can support 32 16-bit add/sub-operations. As such, the control unit 118 can be configured to coordinate operations of the datapath 900 to compute an influence that a first set of input feature elements of a first input feature map and a second set of input feature elements of a second input feature map have on a set of output feature elements of four (4) output feature maps in a single clock cycle based on the convolution layer instructions 112.

The control unit 118 can be configured to load the set of discretized weights of a discretized weight space (e.g., the discretized weight space 202, as shown in FIG. 2) into the first source register 906 based on the convolution layer instructions 112. Thus, as shown in FIG. 9, the first source register 902 can include discretized weights 938, 940, 942, 944, 946, 948, 950, and 952 that are each 2-bits. By way of example, the control unit 118 is configured to load the first set of input feature elements of the first input feature map and the second set of input feature elements of the second input feature map into one of the third and fourth source registers 908 and 910 based on the convolution layer instructions 112. Thus, as shown in FIG. 9, the second source register 908 includes input feature elements 954, 956, 958, and 960, and the third source register 910 includes input feature elements 962, 964, 966, and 968. Each input feature element of the first and second set of input feature elements 954, 956, 958, 960, 962, 964, 966, and 968 can be 8-bits and each discretized weight of the set of discretized weights can be 2-bits. For example, each discretized weight is a 2-bit ternary weight or 2-bit binary weight. In other examples, each discretized weight is a 1-bit binary weight and represents +1 as 1 or −1 as 0.

Because eight (8) sets of discretized weights are at the first source register 906 and the datapath 900 supports SIMD operations, an influence of each of the first and second set of input feature elements 954, 956, 958, 960, 962, 964, 966, and 968 based on one of the set of discretized weights 938, 940, 942, 944, 946, 948, 950, and 952 on respective output feature elements of the four (4) output feature maps can be computed in parallel. Moreover, because the first source register 906 stores eight (8) sets of discretized weights, the influence of each of the first and second input feature elements 954, 956, 958, 960, 962, 964, 966, and 968 on respective output feature elements of the four (4) output feature maps can be computed simultaneously.

For example, the control unit 118 is configured to load a set of output feature elements of a respective output feature map into one of the first, second, third, and fourth destination registers of a respective destination register set 912, 914, 916, and 918 based on the convolution layer instructions 112. Thus, as shown in FIG. 9, by way of example, the destination register 912 includes output feature elements 970, 972, 974, and 976. Each of the output feature elements 970, 972, 974, and 976 can be 16-bits and stored at one of the first, second, third, and fourth destination registers of the destination register set 912. For example, the control unit 118 is configured to command each of the first, second, third, and fourth destination registers of each respective destination register set 912, 914, 916, and 918 to provide each binary value representing a respective output feature element of the set of output feature elements therein to a respective one of the first, second, third, and fourth MAC circuits 916, 918, 920, and 922 responsive to convolution layer instructions 112.

For example, the control unit 118 is configured to command the first source register 906 to provide a respective discretized weight of the set of discretized weights 938, 940, 942, 944, 946, 948, 950, and 952 to a respective one of the first, second, third, and fourth MAC circuits responsive to convolution layer instructions 112. The control unit 118 can be configured to command the second and third source registers 908 and 910 to provide respective input feature elements 954, 956, 958, 960, 962, 964, 966, and 968 to the respective one of the first, second, third, and fourth MAC circuits based on the convolution layer instructions 112. Each MAC circuit can be configured to ternary multiply each input feature element of each of the first and second input feature elements 954, 956, 958, 960, 962, 964, 966, and 968 by the respective discretized weight of the set of discretized weights 938, 940, 942, 944, 946, 948, 950, and 952 and add each product of the ternary multiplication to a respective output feature element of an output map stored at one of the destination register sets 914, 914, 916, 918.

By way of example, the first MAC circuit is configured to ternary multiply each input feature element of the first set of input feature elements 954, 956, 958, and 960 by the discretized weight 938 to compute the influence that the first set of input feature elements 954, 956, 958, and 960 of the first input feature map has on a respective output feature element of the set of output feature elements 970, 972, 974, and 976. The first MAC circuit can be configured to ternary multiply each input feature element of the second set of input feature elements 962, 964, 966, and 968 by the discretized weight 946 to compute the influence that the second set of input feature elements 962, 964, 966, and 968 of the second input feature map has on the respective output feature element of the set of output feature elements 970, 972, 974, and 976.

The first MAC circuit can be configured to add each product of each ternary multiplication to a respective binary value representing a respective output feature element of the set of output feature elements 970, 972, 974, and 976 at the destination register set 912. For example, the first MAC circuit is configured to add each product based on the ternary multiplication of the first set of input feature elements 954, 956, 958, and 960, and the discretized weight 938 to the respective binary value representing the respective output feature element of the set of output feature elements 970, 972, 974, and 976. The first MAC circuit can be configured to add each product based on the ternary multiplication of the second set of input feature elements 962, 964, 966, and 968 and the discretized weight 946 to the respective binary value representing the respective output feature element of the set of output feature elements 970, 972, 974, and 976. The influence that the first and second set of input feature elements 954, 956, 958, 960, 962, 964, 966, and 968 have on one of the respective output feature elements within remaining destination registers 914, 916, and 918 can be computed based on a respective set of remaining discretized weight 940, 942, 944, 946, 948, 950, and 952 provided to a respective one of the remaining second, third, and fourth MAC circuits in a same or similar manner as described herein.

Accordingly, the control unit 118 can be configured to coordinate operations of the datapath 900 for simultaneous processing of the first and second set of input feature elements 954, 956, 958, 960, 962, 964, 966, and 968 from first and second feature maps responsive to the convolution layer instructions 112, such that the influence of the first and second set of input feature elements 954, 956, 958, 960, 962, 964, 966, and 968 on a respective output feature element of the set output feature elements of the four (4) output feature maps at respective destination register sets 912, 914, 916, and 918 can be computed efficiently.

Figures 10, 11:
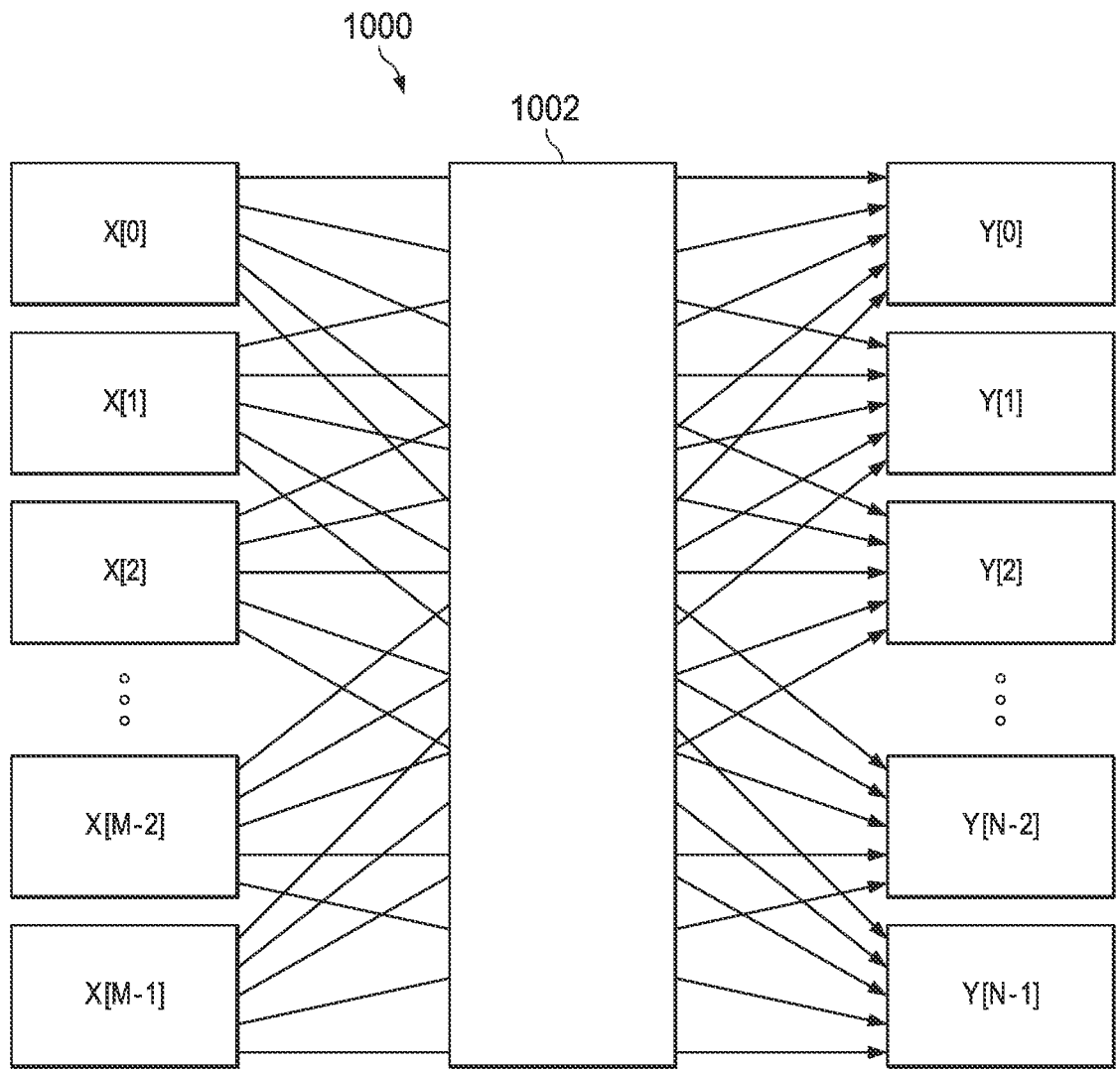
FIG. 10 is an example of a graphical illustration of a fully connected layer.
FIG. 11 is an example of a portion of pseudocode of a neural network system.

FIG. 10 is an example of a graphical illustration of a fully connected layer 1000. The fully connected layer 1000 can be executed on the computing system 100 to determine a number of classes based on a nonlinear function. Thus, the fully connected layer 1000 can implement learning (e.g., classification) to discriminate an input feature map provided by a previous layer (e.g., from a convolution layer, a pooling layer, and the like) of the neural network system 102 into a number of various classes. The fully connected layer 1000 can be executed by the processor 104 based on the fully connected layer instructions 114 stored in the memory 106. As such, the control unit 118 can be configured to coordinate the datapath 120 for processing of the feature map data 108 and the discretized weight data 110 based on the fully connected layer instructions 114.

By way of example, the feature map data 108 includes a set of input feature maps (labeled as "X[0], X[1], X[2], X[M−2], and X[M−1]" in the example of FIG. 10), wherein M is an integer that is equal to or greater than one (1), as shown in FIG. 10. Each input feature map of the set of input feature maps can include a P number of feature elements X[i,j], wherein P is a number equal to or greater than one, X[K] is a respective input feature map, [i,j] is a feature element location in the respective input feature map. Each feature element X[K][i,j] of each input feature map of the set of input feature maps can be represented by a contiguous group of binary digits and stored as part of the feature map data 108 in the memory 106. For example, each feature element X[K][i,j] of each input feature map of the set of input feature maps is of a defined bit size (or length), such as 4-bits, 8-bits, or 16-bits. Each input feature map of the set of input feature maps can have a defined map size.

For example, during classification, the fully connected layer 1000 is configured to convolve input feature elements X[K][i,j] of each input feature map of the set of input feature maps by with a respective discretized weight A[m,n], wherein [m,n] is a location of the respective discretized weight in a discretized weight space 1002 of the fully connected layer 1000, which can be stored as part of the discretized weight data 110. Each discretized weight A[m,n] of the discretized weight space 1002 can be represented by a contiguous group of binary digits. For example, each discretized weight A[m,n] is of a defined bit size (or length), such as 2-bits, or 4-bits. Thus, each discretized weight A[m,n] can be one of a binary weight (e.g., 1 and −1), a ternary weight (+1, 0, and −1), or a quaternary weight (e.g., −1, −0, +0, and +2).

By way of further example, during classification, the set of input feature maps can be processed with respect to the discretized weight space 1002 to update a set of output feature maps (labeled as "Y[0], [1], Y[2], Y[N−2] and Y[N−1]" in the example of FIG. 10), wherein N is an integer that is equal to or greater than one (1) as shown in FIG. 10. Each output feature map of the set of output feature maps includes output feature elements Y[K][i,j], wherein Y[K] is a respective output feature map and [i,j] is a feature element location in the respective output feature map. Each output feature element Y[K][i,j] of each output feature map of the set output feature maps can be represented by a contiguous group of binary digits and stored as part of the feature map data 108. For example, each output feature element Y[K][i,j] of each output feature map of the set of output feature maps is of a defined bit size (or length), such as 16-bits. Each output feature map of the set of output feature maps can have a defined map size.

For clarity and brevity purposes, a contribution of a set of input feature elements of the input feature map X[0] to an output feature element of each output feature map of the set of output feature maps based on a set of discretized weights is presented herein with respect to the example of FIG. 10. The influence of remaining input feature elements from respective input feature maps of the set of input feature maps on remaining other output feature elements of the set of output feature maps can be computed in a same or similar manner. By way of example, the set of input feature elements of the input feature map X[0] include first and second input feature elements. Each of the output feature maps of the set of output feature maps can include an output feature element. By way of example, the discretized weight space 1002 includes a set of discretized weights. Each discretized weight of the set of discretized weights can be a ternary weight and can be represented as one of a 01, 10, and 11 in binary form. While examples are described herein wherein ternary weights +1, 0, and −1 are represented as 01, 10, and 11, in other examples, a different binary representation scheme can be used to represent the ternary weights in binary form.

By way of example, the control unit 118 is configured to load the first and second input feature elements of the input feature map X[0] into a first source register of the source registers 138 responsive to the fully connected layer instructions 114. The control unit 118 can be configured to load the set of discretized weights into a second source register of the source registers 138 responsive to the fully connected layer instructions 114. Each discretized weight can be 2-bits and can be employed to compute an influence that the first and second input feature elements have on the output feature element of a respective output feature map of the set of output feature maps. The control unit 118 can be configured to command the ALU 136 to implement ternary multiplication to compute a contribution (e.g., influence) that each of the first and second input feature elements has on the output feature element of the respective output feature map based on a respective subset of discretized weights of the set of discretized weights responsive to the fully connected layer instructions 114. For example, the ALU 136 is configured to ternary multiply the first input feature element by a first discretized weight and the second input feature element by a second discretized weight. The ALU 136 can be configured to add each product of each ternary multiplication to a binary value representing the output feature element of the respective output feature map (e.g., the output feature map Y[0]). The control unit 118 can be configured to command the ALU 136 to implement ternary multiplication to compute a contribution (e.g., influence) that each of the first and second input feature elements has on the output feature element of each remaining respective output feature map based on a remaining subset of discretized weights of the set of discretized weights responsive to the fully connected layer instructions 114 in a same or similar manner as described herein.

Accordingly, the fully connected layer 1000 can be executed by the processor 104 responsive to the fully connected layer instructions 114 to process a set of input feature elements of each input feature map to compute an influence that each input feature element has on a respective output feature element of a respective output feature map based on a respective subset of discretized weights of a set of discretized weights.

FIG. 11 is an example of a portion of pseudocode 1100 of a neural network system, such as the neural network system 102, as shown in FIG. 1. Therefore, the following description of FIG. 11 also refers to FIGS. 1 and 10. The pseudocode 1100 can be a high-level language code representation of a portion of the fully connected layer instructions 114 of the neural network system 102, as shown in FIG. 1. The pseudocode 400 can be a multi-cycle instruction that can perform MAC operations over a number of clock cycles to compute an influence that a set of input feature elements of an input feature map has on an output feature element of a respective output feature map based on a respective subset of discretized weights of a set of discretized weights of a discretized weight map (e.g., the discretized weight map 1002, as shown in FIG. 10).

For example, the pseudocode 1100 in the example of FIG. 11 can be implemented over eight (8) clock cycles. For example, the datapath 120 of the processor 104 is configured to support 16-bit add/sub-operations to implement MAC operations. For example, the ALU 136 of the processor 104 can be configured to support two (2) ternary operations per each clock cycle. Because the pseudocode 1100 is a multi-cycle instruction and For example, the datapath 120 supports two (2) 16-bit add/sub-operations, the ALU 136 can be configured to perform MAC operations over eight (8) cycles to update sixteen (16) output values representative of output feature elements of output feature maps at the set of destination registers 140 of the register file 134. For example, the ALU 136 is configured to support sixteen (16) ternary operations per each clock cycle, such that the ALU 136 is configured to perform MAC operations in a single cycle to update the sixteen (16) output values representative of the output feature elements of the output feature maps.

Figures 12, 20, 21:
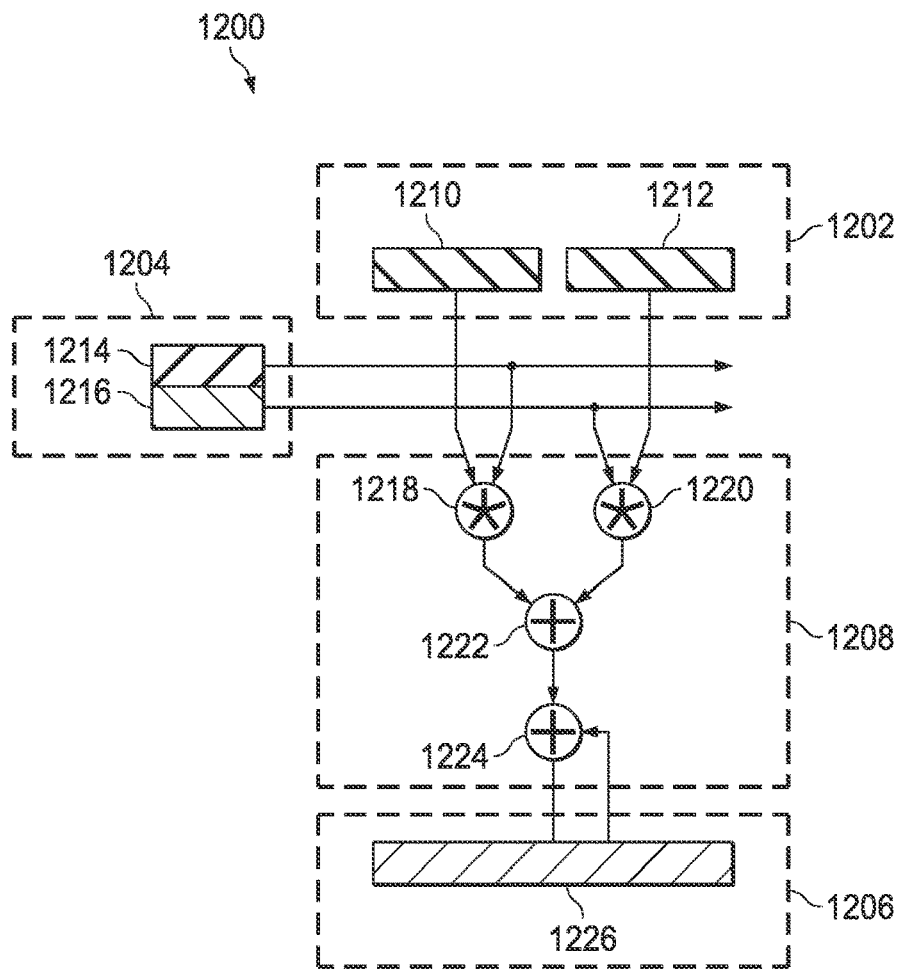
FIG. 12 is another example of a portion of a datapath configured to implement convolution computations.
FIG. 20 is an example of a portion of pseudocode of a neural network system.
FIG. 21 is another example of a portion of pseudocode of a neural network system.

FIG. 12 is an example of a portion of a datapath 1200 configured to implement convolution computations. For example, the datapath 1200 is the datapath 120, as shown in FIG. 1. Therefore, the following description of FIG. 12 also refers to FIGS. 1 and 10-11. As shown in the example of FIG. 12, the datapath 1200 can include a first source register 1202, a second source register 1204, and a destination register 1206. The source registers 138 can include the first and second source registers 1202 and 1204, and the destination registers 140 can include the destination register 1206, as shown in FIG. 1. For example, the first and second source registers 1202 and 1204, and the destination register 1206 are each 32-bits wide. The datapath 1200 can include a MAC circuit 1208. The MAC circuit 1208 can be implemented as a combinational digital circuit that can perform ternary multiplication and addition operations. For example, the MAC circuit 1208 is the MAC circuit 142 of the ALU 136, as shown in FIG. 1.

For example, the control unit 118 is configured to control operations of the datapath 1200 to compute an influence that a set of input feature elements of an input feature map have on each output feature element of a set of output feature elements of a respective output feature map based on the fully connected layer instructions 114. For example, the fully connected layer instructions 114 can be multi-cycle instructions that can perform MAC operations over a k number of clock cycles. By way of example, in the example of FIG. 12, the fully connected layer instructions 114 are implemented over k=8 clock cycles. During each clock cycle, the control unit 118 can be configured to coordinate operations of the datapath 1200 based on the fully connected layer instructions 114. Accordingly, the control unit 118 can be configured to coordinate operations of the datapath 1200 to update the set of output feature elements of the respective output feature map to indicate an influence a respective input feature element of the set of input feature elements has on a respective output feature element of the set of output feature elements based on the respective subset of discretized weights, as described herein.

The control unit 118 is configured to load a set of discretized weights of a discretized weight space (e.g., the discretized weight space 1002, as shown in FIG. 10) into the first source register 1202 responsive to the fully connected layer instructions 114. Thus, as shown in FIG. 12, the first source register 1202 can include a first and a second discretized weight 1210 and 1212. For clarity and brevity purposes, the example of FIG. 12 shows the first and second discretized weights 1210 and 1212 of the set of discretized weights loaded into the first source register 1202 by the register file 134. By way of example, the control unit 118 is configured to load the set of input feature elements of a respective input feature map into the second destination register 1204 responsive to the fully connected layer instructions 114. Thus, as shown in FIG. 12, the second source register 1204 includes first and second input feature elements 1214 and 1216. Each input feature element of the set of input feature elements can be 8-bits and each discretized weight of the set of discretized weights can be 2-bits. For example, each discretized weight is a 2-bit ternary weight or 2-bit binary weight.

By way of example, during a first clock cycle (e.g., k=1), the control unit 118 is configured to command the first source register 1202 to provide each of the first and second discretized weights 1210 and 1212 to the MAC circuit 1208 responsive to the fully connected layer instructions 114. The control unit 118 is configured to command the second source register 1204 to provide the first and second input feature elements 1214 and 1216 to the MAC circuit 1208 responsive to the fully connected layer instructions 114. For example, the MAC circuit 1208 can include first and second ternary circuits 1218 and 1220, and first and second adder circuits 1222 and 1224. Each of the first and second ternary circuits 1218 and 1220 can be configured to receive one of the first and second input feature elements 1214 and 1216, and one of the first and second discretized weights 1210 and 1212. Each of the first and second ternary circuits 1218 and 1220 can be configured to ternary multiply a respective one of the first and second input feature elements 1214 and 1216 by one of the first and second discretized weights 1210 and 1212 to generate a product.

For example, the ternary circuits 1218 and 1220 are configured to implement ternary multiplication in parallel. As such, the MAC circuit 1208 can be configured to support two (2) 16-bit add/sub-operations to compute a respective product based on a respective one of the first and second input feature elements 1214 and 1216, and further based on one of the first and second discretized weights 1210 and 1212. Thus, during the first clock cycle, products can be computed in parallel and provided to the first adder circuit 1222. The first adder circuit 1222 can be configured to add the products from each ternary circuit 1218 and 1220 and output a combined product to the second adder circuit 1224. For example, the control unit 118 is configured to load an output feature element 1226 of a respective output feature map into the destination register 1206 responsive to the fully connected layer instructions 114. The output feature element 1226 stored at the destination register 1206 can be 16-bits. For example, during the first clock cycle, the control unit 118 is configured to command the destination register 1206 to provide the output feature element 1226 to the MAC circuit 1208 responsive to the fully connected layer instructions 114.

For example, during the first clock cycle, the second adder circuit 1224 is configured to add the combined product to a binary value representing the output feature element 1226. The MAC circuit 1208 can be configured to store a product of the addition at the destination register 1206 to update the output feature element 1226 to indicate an influence that each of the first and second input feature elements 1214 and 1216 have on the output feature element 1226. Accordingly, during the first clock cycle, the MAC circuit 1208 can be configured to update the output feature elements 1226 of the respective output feature map to indicate an influence that the first and second input feature elements 1214 and 1216 from the respective input feature map have on the output feature element 1226 based on the first and second discretized weights 1210 and 1212.

For example, during a second clock cycle (e.g., k=2), the control unit 118 is configured to load a second subset of discretized weights into the first source register 1202 responsive to the fully connected layer instructions 114. The control unit 118 can be configured to load a second destination register of the destination register 140 with an output feature element from a second output feature map responsive to the fully connected layer instructions 114. The output feature element of the second output feature map can be updated to indicate an influence that the first and second input feature elements 1214 and 1216 have on the output feature element of the second feature map based on the second subset of discretized weights in a same or similar manner as described herein.

The control unit 118 can be configured to command the first source register 1202 to provide subsequent subsets of discretized weights and the second source register 1204 to provide subsequent first and second output feature elements from subsequent output feature maps to the MAC circuit 1208 responsive to the fully connected layer instructions 114 for a subsequent k number of clock cycles. For example, during each subsequent clock cycle of the k number of remaining clock cycles, the MAC circuit 1208 is configured to compute an influence that each of the first and second input feature elements 1214 and 1216 of the input feature map has on a respective output feature element of the subsequent output feature maps based on one of the subsequent subsets of discretized weights.

Accordingly, the control unit 118 can be configured to coordinate operations of the datapath 1200 for processing of the first and second input feature elements 1214 and 1216 responsive to the fully connected layer instructions 114, such that the influence of the first and second input feature elements 1214 and 1216 on a respective output feature element in respective output feature maps can be computed efficiently.

Figure 13:
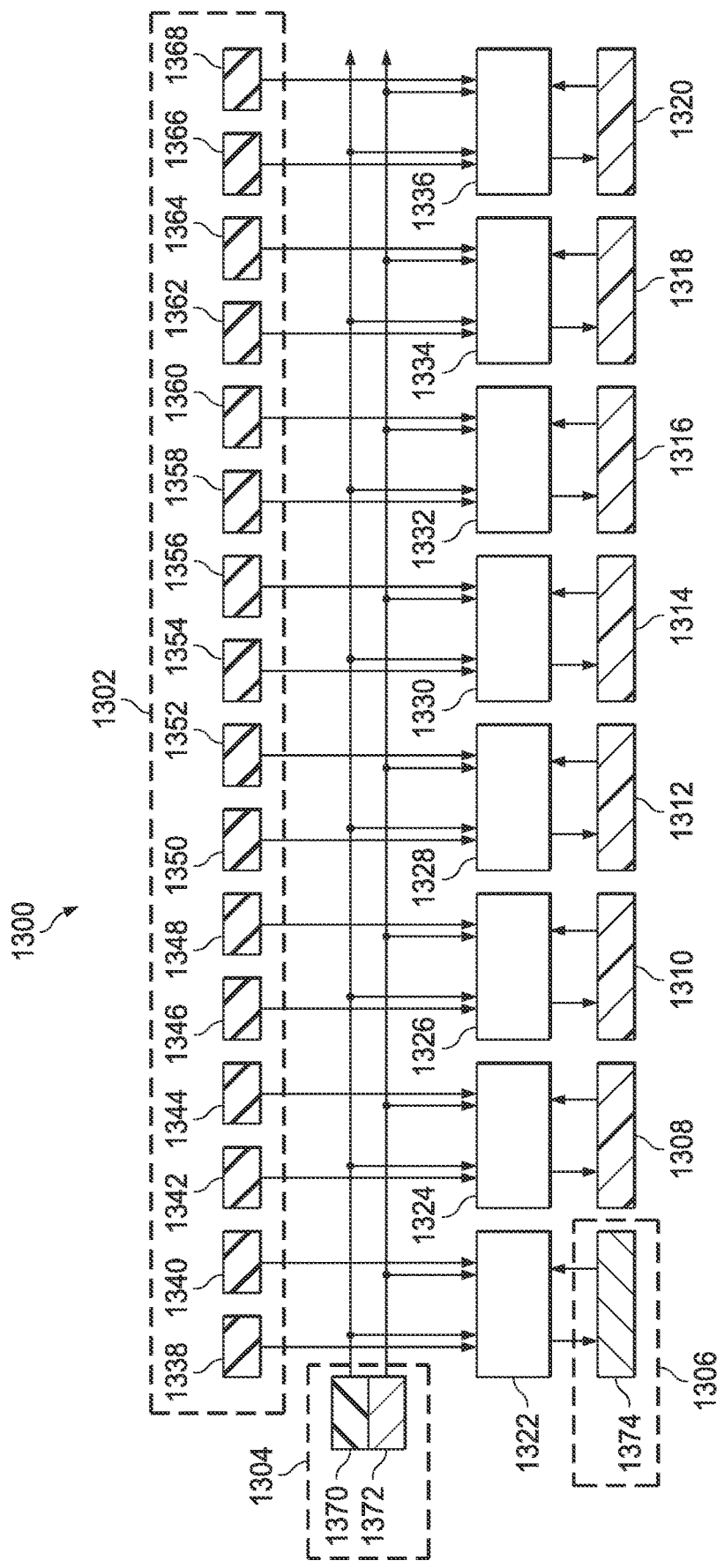
FIG. 13 is a further example of a portion of a datapath configured to implement convolution computations.

FIG. 13 is an example of a portion of a datapath 1300 configured to implement convolution computations. For example, the datapath 1300 is the datapath 120, as shown in FIG. 1. The datapath 1300 can be configured to support SIMD operations. Therefore, the following description of FIG. 13 also refers to FIGS. 1 and 10-12. As shown in the example of FIG. 13, the datapath 1300 can include a first source register 1302, a second source register 1304, and destination registers 1306, 1308, 1310, 1312, 1314, 1316, 1318, and 1320. For example, the first and second source registers 1302 and 1304, and the destination registers 1306, 1308, 1310, 1312, 1314, 1316, 1318, and 1320 are each 32-bits wide. The source registers 138 can include the first and second source registers 1302 and 1304, and the destination registers 140 can include the destination registers 1306, 1308, 1310, 1312, 1314, 1316, 1318, and 1320, as shown in FIG. 1. The datapath 1300 can include MAC circuits 1322, 1324, 1326, 1328, 1330, 1332, 1334, and 1336. Each MAC circuit 1322, 1324, 1326, 1328, 1330, 1332, 1334, and 1336 can be implemented similar to the MAC circuit 1208, as shown in FIG. 12. Thus, each MAC circuit 1322, 1324, 1326, 1328, 1330, 1332, 1334, and 1336 can be implemented as a combinational digital circuit that can perform ternary multiplication and addition operations. For example, the MAC circuits 1322, 1324, 1326, 1328, 1330, 1332, 1334, and 1336 are implemented as part of the ALU 136, as shown in FIG. 1.

Because the datapath 1300 supports SIMD operations, For example, the fully connected layer instructions 114 can instruct the control unit 118 to coordinate simultaneous convolutions of input feature maps with respective discretized weights using MAC operations. Moreover, because the datapath 1300 employs two (2) ternary circuits per each MAC circuit 1322, 1324, 1326, 1328, 1330, 1332, 1334, and 1336, the datapath 1300 can support sixteen (16) 16-bit add/sub-operations. As such, the control unit 118 can be configured to coordinate an operation of the datapath 1300 to compute an influence that a set of input feature elements of a respective input feature map have on an output feature element of respective output feature maps over a single clock cycle responsive to the fully connected layer instructions 114.

The control unit 118 can be configured to load a set of discretized weights of the discretized weight map 1002 into the first source register 1302 responsive to the convolution layer instructions 112. Thus, as shown in FIG. 13, the first source register 1302 can include the set of discretized weights 1338, 1340, 1342, 1344, 1346, 1348, 1350, 1352, 1354, 1356, 1358, 1360, 1362, 1364, 1366, and 1368 that are each 2-bits wide. By way of example, the control unit 118 is configured to load the set of input feature elements from the respective input feature map into the second source register 1304 responsive to the fully connected layer instructions 114. As such, the second source register 1304 can include first and second input feature elements 1370 and 1372. The set of input feature elements can each be 8-bits and each discretized weight of the set of discretized weights can be 2-bits. For example, each discretized weight of the set of discretized weights is a 2-bit ternary weight or 2-bit binary weight.

Because eight (8) sets of discretized weights are at the first source register 1302 and the datapath 1300 supports SIMD operations, an influence of each of the first and second input feature elements 1370 and 1372 based on a respective subset of discretized weights of the set of discretized weights 1338, 1340, 1342, 1344, 1346, 1348, 1350, 1352, 1354, 1356, 1358, 1360, 1362, 1364, 1366, and 1368 on the output feature element of the respective output feature maps can be computed in parallel. Moreover, because the first source register 1302 stores eight (8) sets of discretized weights, the influence of each of the first and second input feature elements 1370 and 1372 on the respective output feature element of eight (8) output feature maps can be computed simultaneously.

For example, the control unit 118 is configured to command the first source register 1302 to provide the respective subset set of discretized weights of the set of discretized weights 1338, 1340, 1342, 1344, 1346, 1348, 1350, 1352, 1354, 1356, 1358, 1360, 1362, 1364, 1366, and 1368 to one of the MAC circuits 1322, 1324, 1326, 1328, 1330, 1332, 1334, and 1336 responsive to the fully connected layer instructions 114. The control unit 118 can be configured to command the second source register 1304 to provide each of the first and second input feature elements 1370 and 1372 to each of the MAC circuits 1322, 1324, 1326, 1328, 1330, 1332, 1334, and 1336 responsive to the fully connected layer instructions 114. For example, the control unit 118 is configured to load the output feature element of each of the respective output feature maps into one of the destination register 1306, 1308, 1310, 1312, 1314, 1316, 1318, and 1320 responsive to the fully connected layer instructions 114.

Thus, by way of example, as shown in FIG. 12, the destination register 1306 includes an output feature element 1374 of a first output feature map.

For example, each MAC circuit 1322, 1324, 1326, 1328, 1330, 1332, 1334, and 1336 is configured to ternary multiply each of the first and second input feature elements 1370 and 1372 by the respective subset of discretized weights. The MAC circuits 1322, 1324, 1326, 1328, 1330, 1332, 1334, and 1336 can be configured to add respective products provided based on one of the first and second input feature elements 1370 and 1372 and the respective subset of discretized weights to produce a combined product. The combined product can be added to output feature elements of a respective output feature map stored at one of the destination registers 1306, 1308, 1310, 1312, 1314, 1316, 1318, and 1320. Each destination register can be 32-bits and store an output feature element of the respective output feature map.

By way of example, the MAC circuit 1322 is configured to implement ternary multiplication and addition of products based on the first and second input feature elements 1370 and 1372 and further based on the set of discretized weights 1338 and 1340. For example, the MAC circuit 1322 can be configured to ternary multiply each of the first and second input feature elements 1370 and 1372 by one of the discretized weights of the set of discretized weights 1338 and 1340. A product provided based on the first input feature element 1370 and the discretized weight 1338 and a product provided based on the second input feature element 1372 and the discretized weight 1340 can be added to produce a combined product. For example, the MAC circuit 1322 is configured to add the combined product to a respective binary value representing the output feature element 1374 of the first output feature map at the destination register 1306. Each remaining MAC circuits 1324, 1326, 1328, 1330, 1332, 1334, and 1336 can be configured to compute the influence that the first and second input feature elements 1370 and 1372 have on the output feature element of remaining output feature maps based on a remaining subset of discretized weights in a same or similar manner as described herein.

Accordingly, the control unit 118 can be configured to coordinate operations of the datapath 1300 for simultaneous processing of the first and second input feature elements 1370 and 1372 from the respective input feature map responsive to the fully connected layer instructions 114, such that the influence of the first and second input feature elements 1370 and 1372 on the output feature element of the respective output feature maps can be computed efficiently.

FIG. 14 is an example of a portion of pseudocode 1400 of a neural network system, For example, the neural network system 102, as shown in FIG. 1. Therefore, the following description of FIG. 14 also refers to FIG. 1. For example, the convolution layer instructions 112 include coded instructions of the pseudocode 1400. Thus, For example, the convolution layer instructions 112 are programmed to populate a LUT for computing an influence that a set of input feature elements of an input feature map have on at least one output feature element of an output feature map based on a LUT, as described herein. For example, the pseudocode 1400 is expressed by the following expression (1): Y[n][i][j]+=(X[4*m][i][j]*K0[4*m,n]+X[4*m+1][i][j]*K0[4*m+1,n]+X[4*m+2][i][j]*K0[4*m+2,n]+X[4*m+3][i][j]*K0[4*m+3,n])−(X[4*m][i][j]*K1[4*m,n]+X[4*m+1][i][j]*K1[4*m+1,n]+X[4*m+2][i][j]*K1[4*m+2,n]+X[4*m+3][i][j]*K1[4*m+3,n]). The expression (1) can be referred to as a LUT populate expression.

The processor 104 can be configured to execute the LUT populate expression to populate the LUT for processing of the set of input feature elements. For example, for a set of four (4) input feature elements of the input feature map X[4*m][i][j], X[4*m+1][i][j], X[4*m+2][i][j], X[4*m+3][i][j]—each of the two 4 term additions in expression (1) can take sixteen (16) possible values. The processor 104 can be configured to execute the LUT populate expression to compute the sixteen (16) possible values and populate the LUT with the sixteen (16) possible values. Thus, the processor 104 can be programmed to execute the expression (1) to compute sixteen (16) possible values that the at least one output feature element can have based on the set of input feature elements from a respective input feature map.

FIG. 15 is an example of a LUT 1500. The LUT 1500 can be populated based on an input feature map. Therefore, the following description of FIG. 15 also refers to FIGS. 1 and 14. The LUT 1500 can be populated based on a set of input feature elements of an input feature map. For example, a set of four (4) input feature elements are used to populate the LUT 1500. The set of four (4) input feature elements of the input feature map are referred to as X1, X2, X3, and X4, respectively, in the LUT. Each of the set of input feature elements X1, X2, X3, and X4 can be 8-bits.

The LUT includes a first address column 1502 and a second address column 1504, a first LUT value column 1506, and a second LUT value column 1508. The processor 104 can be configured to execute the LUT populate expression to populate each of the first and second LUT value columns 1506 and 1508. Each of the first and second address columns 1502 and 1504 includes 4-bit binary values representative of LUT addresses for respective LUT values in one of the first and second LUT value columns 1506 and 1508. Each of the first and second LUT value columns 1506 and 1508 includes LUT values that can be computed based on respective logical LUT expressions. In an example, each LUT value of each of the first and second LUT value columns 1506 and 1508 can be ten (10) bits.

The control unit 118 can be configured to coordinate operations of the ALU 136 to execute each logical LUT expression to compute a respective LUT value. For example, the ALU 136 can be configured to execute the respective logical LUT expressions (as shown in FIG. 15 at respective first and second LUT value columns 1506 and 1508) to calculate the LUT values based on the set of input feature elements. By way of example, the ALU 136 is configured to execute a respective logical LUT expression at a location 1510 of the second LUT value column 1508 to compute a respective LUT value.

For example, the convolution layer instructions 112 are programmed to instruct the control unit 118 to implement the LUT 1500. For example, the control unit 118 is configured to designate sixteen (16) destination registers of the destination registers 140 of the register file 134 for storing each respective computed LUT value of the first and second LUT value columns 1506 and 1508 responsive to the convolution layer instructions 112. The control unit 118 is configured to assign a respective LUT address to each of the sixteen (16) destination registers responsive to the convolution layer instructions 112.

For example, the control unit 118 is configured to load the set of input feature elements X1, X2, X3, and X4 into a first source register of the source registers 138 of the register file 134 responsive to the convolution layer instructions 112. The control unit 118 can be configured to command the first source register to provide the ALU 136 the set of input feature elements X1, X2, X3, and X4 for populating the first and second LUT value columns 1506 and 1508 with LUT values responsive to the convolution layer instructions 112. For example, the control unit 118 is configured to command the ALU 136 to implement each logical LUT expression as shown at the first and second LUT value columns 1506 and 1508, and store a result of each LUT logical expression as a LUT value in one of the sixteen (16) destination registers responsive to the convolution layer instructions 112. By way of example, the ALU 136 is configured to execute a respective logical LUT expression for the location 1510 to add binary values representative of the input feature elements X2, X3, and X4, and store a result of the addition in a respective destination register of the sixteen (16) destination registers. Accordingly, the control unit 118 can be configured to coordinate operations of the datapath 120 to populate the LUT 1500. The populated LUT 1500 can be used for computing an influence that the set of input feature elements have on at least one output feature element of an output feature map, as described herein.

For example, in a single clock cycle, the processor 104 is configured to compute the influence that the set of input feature elements have on the output feature element of the output feature map. For example, the processor 104 is configured to populate two or more LUTs based on the convolution layer instructions 112. For example, the two or more LUTs are populated with similar LUT values and different discretized weights can be used to address each of the two or more LUTs, thus enable the processor 104 to compute a contribution of the set of input feature elements to multiple output feature elements of multiple output feature maps. For example, the two or more LUTs are populated with two or four sets of input feature elements from a respective input feature map. The same set of discretized weights can be used to access each LUT to calculate a contribution of the two or four sets of input feature elements from the input feature map to multiple output feature elements of the output feature map.

Figures 16, 17:
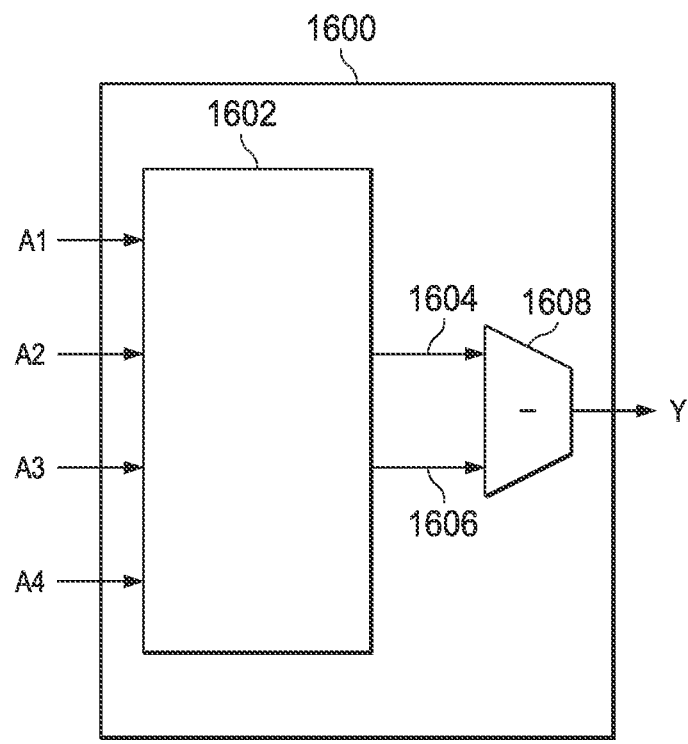
FIG. 16 is an example of a LUT register file configured to implement convolution computations.
FIG. 17 is an example of another LUT.

FIG. 16 is an example of a LUT register file 1600 configured to implement convolution computations. For example, the LUT register file 1600 is implemented as the register file 134, as shown in FIG. 1. Therefore, the following description of FIG. 16 also refers to FIGS. 1 and 14-15. For example, as described herein, the convolution layer instructions 112 are programmed to command the control unit 118 to coordinate operations of the LUT register file 1600 to compute the influence that a set of input feature elements of an input feature map have on at least one output feature element of an output feature map based on the LUT 1602. By employing the LUT register file 1600, the processor 104 can be configured to compute in a single clock cycle the influence that the set of input feature elements of the input feature map have on the at least one output feature element of the output feature map. For example, the LUT register file 1600 is implemented as a 2-ported register file.

The LUT register file 1600 can include a LUT 1602. The LUT 1602 can be implemented similar to the LUT 1500, as shown in FIG. 15. Thus, a set of destination registers, such as sixteen (16) destination registers of the LUT register file 1600 can be designated to store LUT values of the LUT 1602 computed based on the convolution layer instructions 112, as described herein. The control unit 118 is configured to load a set of discretized weights A1, A2, A3, and A4 into a source register (e.g., one of the source registers 138, as shown in FIG. 1) of the LUT register file 1600 for computing the influence that the set of input feature elements of the input feature map have on the at least one output feature element of the output feature map responsive to the convolution layer instructions 112. Each discretized weight of the set of discretized weights A1, A2, A3, and A4 can be 2-bits.

The control unit 118 can be configured to command the LUT register file 1600 read the LUT 1602 based on the set of discretized weights A1, A2, A3, and A4. By way of example, the set of four discretized weights include a first grouping of binary values and a second grouping of binary values. For example, the first grouping of binary values is 1110, wherein "11" is a first discretized weight of the set of discretized weights A1, A2, A3, and A4 and "10" is a second discretized weight of the set of discretized weights A1, A2, A3, and A4. By way of further example, the second grouping of binary values is 0001, wherein "00" is a third discretized weight of the set of discretized weights A1, A2, A3, and A4 and "01" is a fourth discretized weight of the set of discretized weights A1, A2, A3, and A4. The control unit 118 can be configured to read LUT value 1604 at 1110 of a first address column (e.g., the first address column 1502, as shown in FIG. 15) of the LUT 1602 based on the first grouping of binary values responsive to the convolution layer instructions 112. The control unit 118 can be configured to command the LUT register file 1600 read LUT value 1606 at 0001 of a second address column (e.g., the second address column 1504, as shown in FIG. 15) of the LUT 1602 based on the second grouping of binary values responsive to the convolution layer instructions 112.

For example, the LUT register file 1600 includes a subtraction circuit 1608. In other examples, the subtraction circuit 1608 can be implemented at the ALU 136, as shown in FIG. 1. The control unit 118 can be configured to command the subtraction circuit 1608 to subtract the second LUT value 1606 from the first LUT value 1604 responsive to the convolution layer instructions 112. A result of the subtraction (shown as "Y" in the example of FIG. 16) can be outputted. The control unit 118 can be configured to command the LUT register file 1600 or the ALU 136 to add the result of the subtraction to a respective destination register of the LUT register file 1600 storing a value representative of the output feature element of the output feature map. The binary value can be updated to indicate an influence of the set of output feature elements on the at least one output feature element of the output feature map. Accordingly, the set of discretized weights can be used for addressing the LUT 1602, such that the processor 104 can be configured to compute in a single clock cycle the influence that the set of input feature elements of the input feature map have on the output feature element of the output feature map.

FIG. 17 is an example of another LUT 1700. The LUT 1700 can be populated by the processor 104 based on an input feature map. Therefore, the following description of FIG. 17 also refers to FIG. 1. The LUT 1700 can be populated based on a set of input feature elements of the input feature map. For example, a set of four (4) input feature elements is used to populate the LUT 1700. The set of four (4) input feature elements of the input feature map are referred to as X1, X2, X3, and X4, respectively, in the LUT 1700. Each of the set of input feature elements X1, X2, X3, and X4 can be 8-bits wide.

The LUT 1700 includes a first address column 1702, a second address column 1704 a first LUT value column 1706, and a second LUT value column 1708. Each of the first and second address columns 1702 and 1704 includes 4-bit wide binary values representative of LUT addresses for respective LUT values in one of the first and second LUT value columns 1706 and 1708. Each of the first and second LUT value columns 1706 and 1708 includes LUT values that can be computed based on respective logical LUT expressions.

In an example, each LUT value of each of the first and second LUT value columns 1706 and 1708 can be ten (10) bits. The control unit 118 can be configured to coordinate operations of the ALU 136 to execute each logical LUT expression to compute a respective LUT value. For example, the control unit 118 can be configured to command the ALU 136 to execute the respective logical LUT expressions (as shown in FIG. 17 at respective first and second LUT value columns 1706 and 1708) to calculate the LUT values based on the set of input feature elements responsive to the convolution layer instructions 112. By way of example, the ALU 136 can be configured to execute a respective logical LUT expression at a location 1710 of the first LUT value column 1706 to compute a respective LUT value.

For example, the convolution layer instructions 112 are programmed to instruct the control unit 118 to implement the LUT 1700 at the register file 138. For example, the control unit 118 is configured to designate sixteen (16) destination registers of the destination registers 140 of the register file 138 for storing each respective computed LUT value of the first and second LUT value columns 1706 and 1708 responsive to the convolution layer instructions 112. The control unit 118 is configured to assign a respective LUT address to each of the sixteen (16) destination registers responsive to the convolution layer instructions 112.

For example, logical LUT expressions for computing LUT values of the first LUT value column 1706 and logical LUT expressions for computing LUT values of the second LUT value 1708 column exhibit logical symmetry between each other. Because the logical LUT expressions for computing the LUT values for the first and second LUT value columns 1706 and 1708 can exhibit symmetry, the ALU 136 can be configured to populate one of the first and second LUT value columns 1706 and 1708. A remaining one of the first and second LUT value columns 1706 and 1708 can be populated (e.g., by the ALU 136) by multiplying the populated LUT value column by "4."

For example, the control unit 118 is configured to load the set of input feature elements X1, X2, X3, and X4 into a first source register of the source registers 138 of the register file 134 responsive to the convolution layer instructions 112. The control unit 118 can be configured to command the first source register to provide to the ALU 136 the set of input feature elements X1, X2, X3, and X4 for populating one of first and second LUT value columns 1706 and 1708 with LUT values responsive to the convolution layer instructions 112. For example, the control unit 118 is configured to command the ALU 136 to implement each logical LUT expression as shown at one of the first and second LUT value columns 1706 and 1708 of FIG. 15 and store a result of each LUT logical expression as a LUT value in one of the sixteen (16) destination registers. By way of example, the ALU 136 is configured to execute a respective logical LUT expression at location 1710 to process binary values representative of the input feature elements X1, X2, X3, and X4, and store a result in a respective destination register of the sixteen (16) destination registers. Accordingly, the control unit 118 can be configured to coordinate operations of the datapath 120 to populate the LUT 1700. The populated LUT 1700 can be used for computing an influence that the set of input feature elements have on an output feature element of an output feature map, as described herein.

For example, the control unit 118 can be configured to command the ALU 136 to implement a butterfly addition to populate the first and second LUT value columns 1706 and 1708 of the LUT 1700 responsive to the convolution layer instructions 112. The control unit 118 can be configured to command the ALU 136 to implement a first butterfly addition, a second butterfly addition, and a third butterfly addition to populate the first and second LUT value columns 1706 and 1708 responsive to the convolution layer instructions 112. For example, the first butterfly addition commands the ALU 136 to implement the following butterfly logical expressions: X1+X2, X1-X2, X3+X4, and X3-X4. The second butterfly addition can command the ALU 136 to implement the following butterfly logical expressions: X1+X3, X1-X3, X2+X4, and X2-X4. The third butterfly addition can command the ALU 136 to implement the following butterfly logical expressions: X1+X4, X1-X4, X2+X3, and X2-X3. The control unit 118 can be configured to command the ALU 136 to store a result of each of the butterfly logical expression in respective destination registers of the destination register 140. For example, if each of the input feature elements X1, X2, X3, and X4 are 8-bits, the ALU 136 is configured to compute four (4) 16-bit LUT values. The four (4) 16-bit LUT values can be stored in the respective destination registers, which can be 32-bits. Thus, the control unit 118 is configured to command the ALU 136 to store the four (4) 16-bit LUT values in neighboring destination registers. The stored four (4) 16-bit LUT values can be used for computing the influence that the set of input feature elements have on the at least one output feature element of the output feature map, as described herein.

Figure 18:
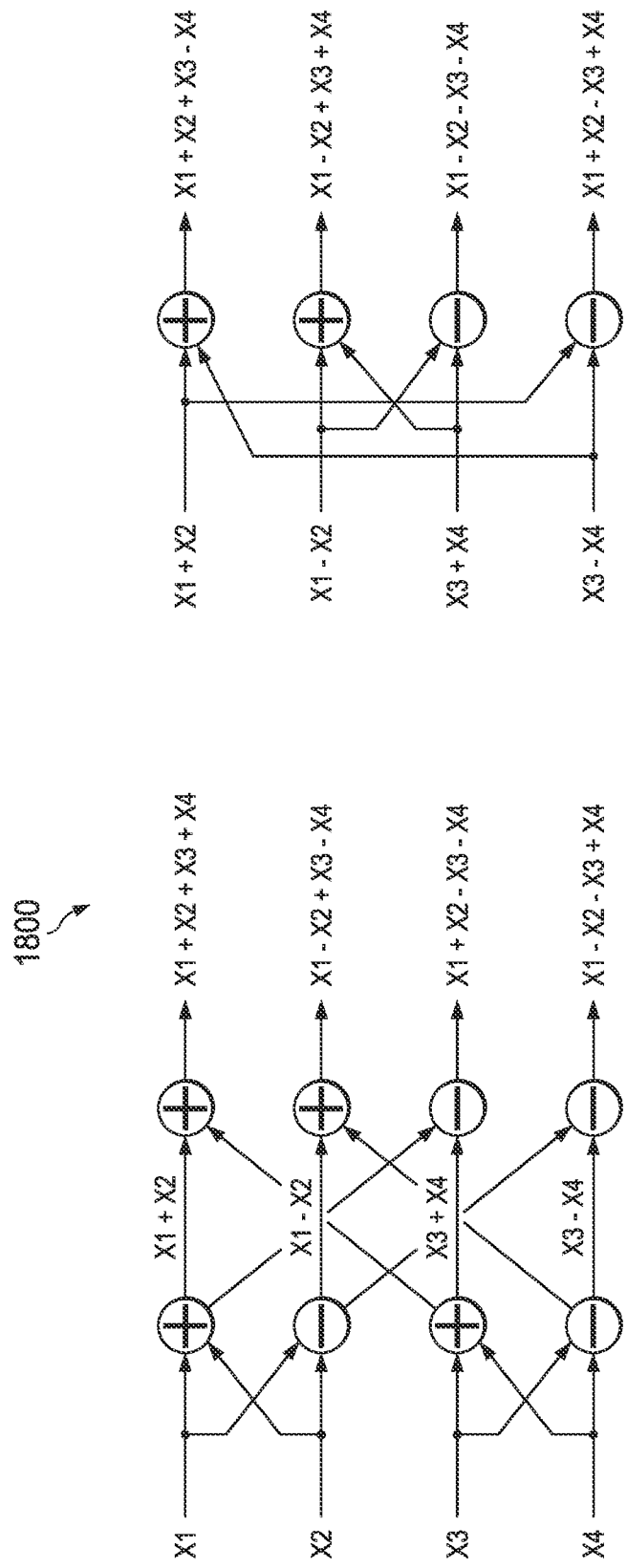
FIG. 18 is an example of LUT generation logic.

FIG. 18 is an example of a LUT generation logic 1800. The LUT generation logic 1800 can be implemented at the ALU 136 of the processor 104 based on the convolution layer instructions 112 to compute LUT values for one of the first and second LUT value columns 1706 and 1708, as shown in FIG. 17. Therefore, the following description of FIG. 18 also refers to FIGS. 1 and 17. By way of example, the control unit 118 is configured to coordinate operations of the register file 134 and the ALU 136 to populate the second LUT value column 1708 based on the LUT generation logic 1800. The second LUT value column 1708 can be populated with eight (8) LUT values based on the LUT generation logic 1800. The eight (8) LUT values can be stored in a first set of eight (8) destination registers of the sixteen (16) destination registers of the destination registers 140 that can collectively represent the second LUT value column 1708. For example, the logical expressions for the second LUT value column 1708 exhibit symmetry with logical expressions of the first LUT value column 1706. As such, the control unit 118 can be configured to command the ALU 136 to multiply each LUT value provided by each logical expression for the second LUT value column 1708 by "4" and store a result of each multiplication in a second set of eight (8) destination registers of the sixteen (16) destination registers of the destination registers 140 that can collectively represent the first LUT value column 1706. The populated LUT 1700 can be used for computing an influence that the set of input feature elements have on an output feature element of an output feature map, as described herein.

Figure 19:
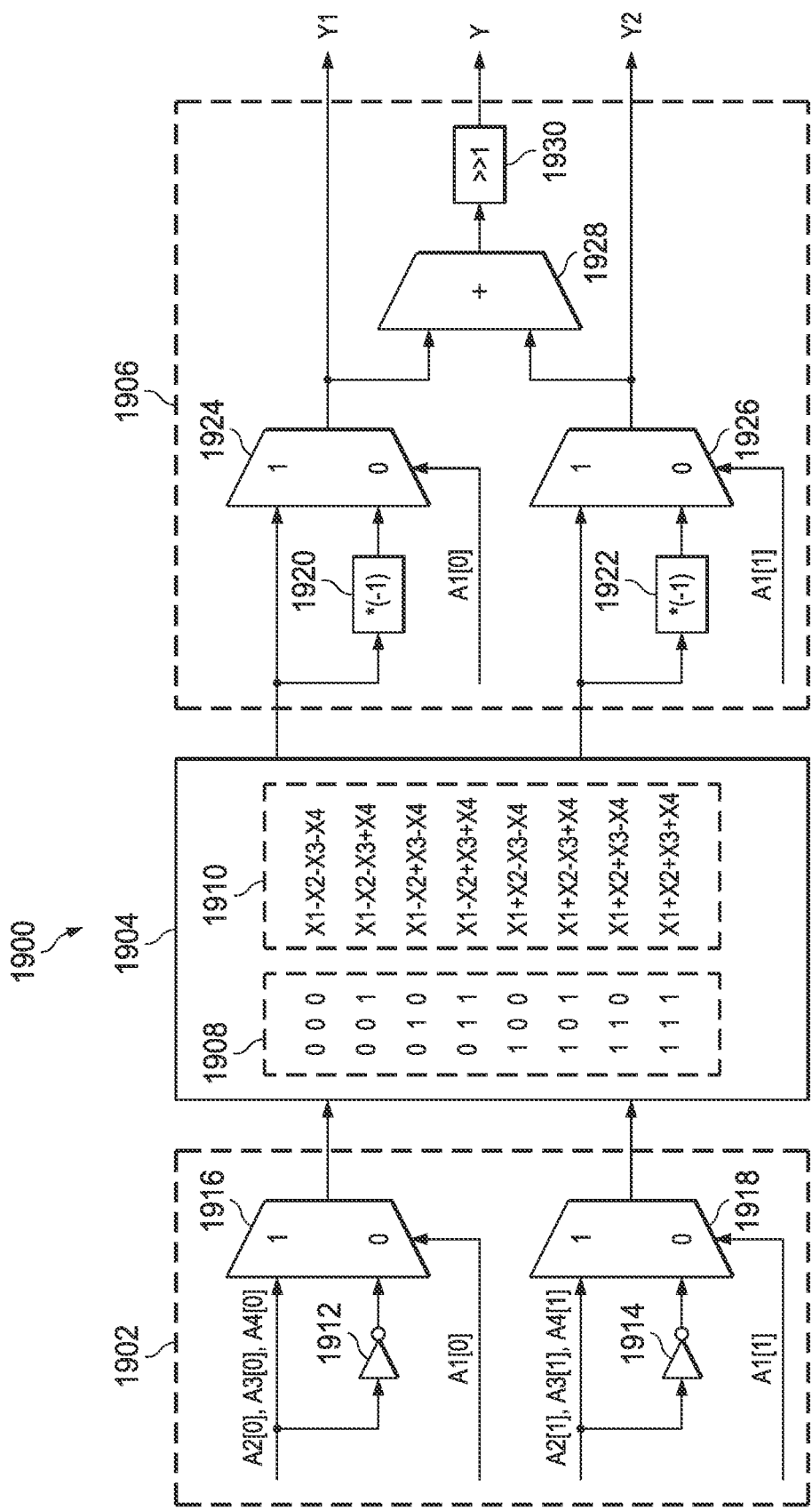
FIG. 19 is another example of a LUT register file configured to implement convolution computations.

FIG. 19 is an example of a LUT register file 1900 configured to implement feature element influence computations. For example, the LUT register file 1900 is the register file 134, as shown in FIG. 1. Therefore, the following description of FIG. 19 also refers to FIGS. 1 and 17-18. For example, as described herein, the convolution layer instructions 112 can be programmed to instruct the control unit 118 to coordinate operations of the LUT register file 1900 to compute the influence that a set of input feature elements of an input feature map have on at least one output feature element of an output feature map based on a LUT. By employing the LUT register file 1902, the processor 104 can be configured to compute in a single clock cycle the influence that the set of input feature elements of the input feature map have on the at least one output feature element of the output feature map. The LUT register file 1900 can include an input stage 1902, a LUT 1904, and an output stage 1906. The control unit 118 can be configured to coordinate operations of the input stage 1902, the LUT 1904, and the output stage 1906 for feature element influence computation responsive to the convolution layer instructions 114.

For example, the control unit 118 is configured to command the LUT register file 1900 to populate the LUT 1904 responsive to the convolution layer instructions 112. The LUT 1904 includes an address column 1908 and a LUT value column 1910. The address column 1908 includes 4-bit binary values representative of LUT addresses for respective LUT values in the LUT value column 1910. The LUT value column 1910 includes LUT values that can be computed based on respective logical LUT expressions. For example, the LUT value column 1910 can be similar to the second LUT value column 1708, as shown in FIG. 17, and thus can be computed by the ALU 136 based on the LUT generation logic 1800, as shown in FIG. 18.

The control unit 118 can be configured to coordinate operations of the ALU 136 to execute each logical LUT expression to compute a respective LUT value. The control unit 118 is configured to designate eight (8) destination registers (e.g., of the destination registers 140, as shown in FIG. 1) for storing each respective computed LUT value of the LUT value column 1910 responsive to the convolution layer instructions 112. Thus, the eight (8) destination registers can be represented as the LUT 1904 in the example of FIG. 19. The control unit 118 is configured to assign a respective LUT address as shown in the address column 1908 to each of the eight (8) destination registers responsive to the convolution layer instructions 112.

For example, the control unit 118 is configured to load a set of input feature elements X1, X2, X3, and X4 into a first source register of the LUT register file 1900 based on the convolution layer instructions 112. The control unit 118 can be configured to command the first source register to provide to the ALU 136 the set of input feature elements X1, X2, X3, and X4 for populating the LUT value column 1910 with LUT values based on the convolution layer instructions 112. For example, the control unit 118 is configured to command the ALU 136 to implement each logical LUT expression as shown at the LUT value column 1910 of FIG. 19, and store a result of each LUT logical expression as a LUT value in one of the eight (8) destination registers responsive to the convolution layer instructions 112. By way of example, each LUT value can be 10-bits.

For example, to compute the influence that the set of input feature elements of the input feature map has on at least one output feature element of the output feature map, the control unit 118 is configured to load a set of discretized weights A1[0], A1[1], A2[0], A2[1], A3[0], A3[1], A4[0], and A4[1] into a second source register of the source registers 138 of LUT register file 1900. Each value with each bracket of the set of discretized weights can be representative of a discretized weight (e.g., a ternary or binary weight). For example, for binary weights, a bit value of 1 can indicate a weight value of +1, and a bit value of 0 can indicate a weight value of −1. For example, for ternary weights, a bit value of 11 can indicate a weight value of +1, a bit value of 10 (or 01) can indicative a weight value of 0, and a bit value of 00 can indicate a weight value of −1. The control unit 118 can be configured to command the second source register to provide the set of discretized weights A1[0], A1[1], A2[0], A2[1], A3[0], A3[1], A4[0], and A4[1] to the input stage 1902 of the LUT register file 1900.

The input stage 1902 includes a first and second logic NOT circuit 1912 and 1914. The input stage 1902 further includes a first multiplexer circuit 1916 and a second multiplexer circuit 1918. An input of each of the first logic NOT and multiplexer circuits 1912 and 1916 can be configured to receive the set of discretized weights A2[0], A3[0], and A4[0]. An input of each of the second logic NOT and multiplexer circuits 1914 and 1918 can be configured to receive the set of discretized weights A2[1], A3[1], and A4[1]. An output of the first logic NOT circuit 1912 can be coupled to a second input of the first multiplexer circuit 1916. The first logic NOT circuit 1912 can be configured to invert the set of discretized weights A2[0], A3[0], and A4[0] to provide an inverted version of the set of discretized weights A2[0], A3[0], and A4[0]. An output of the second logic NOT circuit 1914 can be coupled to a second input of the second multiplexer circuit 1918. The second logic NOT circuit 1914 can be configured to invert the set of discretized weights A2[1], A3[1], and A4[1] and provide an inverted version of the set of discretized weights A2[1], A3[1], and A4[1]. A third input of the first multiplexer circuit 1916 can be configured to receive the discretized weight A1[0]. A third input of the second multiplexer circuit 1918 can be configured to receive the discretized weight A1[1].

For example, the first multiplexer 1916 is configured to provide one of the set of discretized weights A2[0], A3[0], and A4[0] or the inverted version of the set of discretized weights A2[0], A3[0], and A4[0] as a first weighted address input to the LUT 1904 based on a discretized weight value of the discretized weight A1[0]. The second multiplexer 1918 can be configured to provide one of the set of discretized weights A2[1], A3[1], and A4[1] or the inverted version of the set of discretized weights A2[1], A3[1], and A4[1] as a second weighted address input to the LUT 1904 based on a discretized weight value of the discretized weight A1[1]. Each of the first and second weighted address inputs can be used to read respective LUT values from the LUT 1904. As shown in FIG. 19, outputs of respective multiplexers 1916 and 1918 can be coupled to respective inputs of the LUT 1904.

For example, the LUT 1904 can be configured to read out a first LUT value based on the first weighted address input and read out a second LUT value based on the second weighted address input. The LUT 1904 can include first and second outputs that can be coupled to respective inputs to the output stage 1902 to provide one of the first and second LUT values to the output stage. The output stage 1906 includes a first multiplier circuit 1920 and a second multiplier circuit 1922. An input of the first multiplier circuit 1920 can be coupled to the first output of the LUT 1904 to receive the first LUT value, and an input of the second multiplier circuit 1922 can be coupled to the second output of the LUT 1904 to receive the second LUT value. The output stage 1906 can include a third multiplexer circuit 1924 and a fourth multiplexer circuit 1926. A first input of the third multiplexer circuit 1924 can be coupled to the first output of the LUT 1904 to receive the first LUT value and a first input of the fourth multiplexer circuit 1926 can be coupled to the second output of the LUT 1904 to receive the second LUT value. An output of the first multiplier circuit 1920 can be coupled to a second input of the third multiplexer circuit 1924 to provide a negative version of the first LUT value to the third multiplexer circuit 1924. An output of the second multiplier circuit 1922 can be coupled to a second input of the fourth multiplexer circuit 1926 to provide a negative version of the second LUT value to the fourth multiplexer circuit 1926. A third input of the third multiplexer circuit 1924 can be configured to receive the discretized weight A1[0] and a third input of the fourth multiplexer circuit 1926 can be configured to receive the discretized weight A1[1].

For example, the third multiplexer 1924 is configured to provide one of the first LUT value or the negative version of the first LUT value at an output as a first output Y1 based on the discretized weight value of the discretized weight A1[0]. The fourth multiplexer 1926 is configured to provide one of the second LUT value or the negative version of the second LUT value at an output as a second output Y2 based on the discretized weight value of the discretized weight A1[0]. The first output Y1 can indicate an influence of the input feature elements X1, X2, X3, and X4 of the input feature map on a respective output feature element. In examples wherein binary weights are used, the LUT register file 1900 can be configured to compute the influence of the input feature elements X1, X2, X3, and X4 on a first output feature element to provide the first output Y1, and compute the influence of the input feature elements X1, X2, X3, and X4 on a second output feature element to provide the second output Y2. Thus, the first output Y1 can be computed according to the following expression by the LUT register file 1900: Y1=A1[0]*X1+A2[0]*X2+A3[0]*X3+A4[0]*X4. The second output Y2 can be computed according to the following expression by the LUT register file 1900: Y2=A1[1]*X1+A2[1]*X2+A3[1]*X3+A4[1]*X4.

In examples wherein ternary weights are employed, the LUT register file 1900 can be configured to compute the influence of the input feature elements X1, X2, X3, and X4 on a respective output feature element to provide a third output Y3. For example, the LUT register file 1900 can include at the output stage 1906 an adder circuit 1928. A first input of the adder circuit 1928 can be coupled to the output of the third multiplexer circuit 1924, and a second input of the adder circuit 1928 can be coupled to the output of the fourth multiplexer circuit 1926. The adder circuit 1928 can be configured to add the first output provided by the third multiplexer 1924 and the second output Y2 provided by the fourth multiplexer circuit 1926 and output an added output Y1+Y2. An output of the adder circuit 1928 can be coupled to a bit-wise shift circuit 1930 to receive the added output Y1+Y2. Thus, the bit-wise shift circuit 1930 can be configured to receive a binary representation of the added output Y1+Y2. The bit-wise shift circuit 1930 can be configured to shift the added output Y1+Y2 (e.g., to the right) to remove a right-most bit of the binary representation of the added output Y1+Y2 to generate a third output Y3. Thus, in examples wherein ternary weights are used, the LUT register file 1900 can be configured to compute the influence of the input feature elements X1, X2, X3, and X4 on the respective output feature element to provide the third output Y3. Thus, the third output Y3 can be computed according to the following expression by the LUT register file 1900: Y3= (A1[0]+A1[1])*X1+(A2[0]+A2[1])*X2+(A3[0]+A3[1])*X3+(A4[0]+A4[1])*X4. Each of the outputs Y1, Y2, and Y3 can be added to respective binary values representative of respective output feature elements at destination registers.

FIG. 20 is an example of a portion of pseudocode 2000 of a neural network system, For example, the neural network system 102, as shown in FIG. 1. Therefore, the following description of FIG. 20 also refers to FIG. 1. For example, the convolution layer instructions 112 include the pseudocode 2000 that can be programmed to implement convolution of input feature elements of input feature maps with discretized weights to compute an influence that the input feature elements have on output feature elements of output feature maps. For example, the convolution layer instructions 112 can include a LUT populate instruction, such as described herein. The LUT populate instruction can be executed to populate one or more destination registers of the destination registers 140 with LUT values as described herein. The pseudocode 2000 can be employed by the control unit 118 to command the ALU 136 to use add/sub instructions based on the LUT values stored at the destination registers 140 to compute an influence that at least one input feature element of an input feature map has on at least one output feature element of one or more output feature maps.

FIG. 21 is an example of a portion of pseudocode 2100 of a neural network system, For example, the neural network system 102, as shown in FIG. 1. Therefore, the following description of FIG. 19 also refers to FIG. 1. For example, the convolution layer instructions 112 include the pseudocode 2100 that can be programmed to implement convolution of input feature elements of input feature maps with discretized weights to compute an influence that the input feature elements have on output feature elements of output feature maps. For example, the convolution layer instructions 112 can include a LUT populate instruction, such as described herein. The LUT populate instruction can be executed to populate the one or more destination registers of the destination registers 140 with LUT values as described herein. The pseudocode 2100 can be employed by the control unit 118 to command the ALU 136 to use add/sub instructions based on the LUT values stored at the destination registers 140 to compute an influence that at least one input feature element of an input feature map has on at least one output feature element of one or more output feature maps.

As used herein, the term "circuit" can include a collection of active and/or passive elements that perform an electronic circuit function, such as an analog circuit and/or digital circuit. Additionally or alternatively, for example, the term "circuit" can include an integrated circuit (IC) where all or some of the circuit elements are fabricated on a common substrate (e.g., semiconductor substrate, such as a die or chip) or within a common package herein. For example, circuitry as described herein can be implemented on a semiconductor substrate. Additionally, the term "couple" is used throughout the specification. The term may cover connections, communications, or signal paths that enable a functional relationship consistent with this description. For example, if device A generates a signal to control device B to perform an action, in a first example device A is configured to device B, or in a second example device A is configured to device B through intervening component C if intervening component C does not substantially alter the functional relationship between device A and device B such that device B is controlled by device A via the control signal generated by device A.

In this description and the claims, the term "based on" means based at least in part on.

Modifications are possible in the described embodiments, and other embodiments are possible, within the scope of the claims.

What is claimed is:

1. A system comprising:
   a first register;
   a second register;
   a third register;
   a first multiplication circuit having first multiplication inputs and a first multiplication output, the first multiplication inputs coupled to the first and second registers;

a second multiplication circuit having second multiplication inputs and a second multiplication output, the second multiplication inputs coupled to the first and second registers;

a first addition circuit having first addition inputs and a first addition output, the first addition inputs coupled to the first multiplication output and the third register, and the first addition output coupled to the third register; and a second addition circuit having second addition inputs and a second addition output, the second addition inputs coupled to the second multiplication output and the third register, and the second addition output coupled to the third register.

2. The system of claim 1, wherein the first multiplication inputs are coupled to a first subset of bits of the first register and a subset of bits of the second register, the second multiplication inputs are coupled to a second subset of bits of the first register and the subset of bits of the second register, the first addition inputs and the first addition output coupled to a first subset of bits of the third register, and the second addition inputs and the second addition output coupled to a second subset of bits of the third register.

3. The system of claim 1, wherein the first multiplication circuit and the first addition circuit are configurable to perform a first multiplication and accumulation (MAC) operation, and the second multiplication circuit and the second addition circuit are configurable to perform a second (MAC) operation.

4. The system of claim 3, further comprising a controller coupled to the first and second multiplication circuits and the first and second addition circuits, the controller configurable to receive an instruction and responsive to the instruction, cause the first and second multiplication circuits and the first and second addition circuits to perform the first and second MAC operations within a clock cycle.

5. The system of claim 4, wherein the subset of bits of the second register is a first subset of bits of the second register; and wherein the system further comprises:
a third multiplication circuit having third multiplication inputs and a third multiplication output, the third multiplication inputs coupled to the first subset of bits of the first register and a second subset of bits of the second register;
a fourth multiplication circuit having fourth multiplication inputs and a fourth multiplication output, the fourth multiplication inputs coupled to the second subset of bits of the first register and the second subset of bits of the second register;
a third addition circuit having third addition inputs and a third addition output, the third addition inputs coupled to the third multiplication output and the third register, and the third addition output coupled to a third subset of bits of the third register; and
a fourth addition circuit having fourth addition inputs and a fourth addition output, the fourth addition inputs coupled to the fourth multiplication output and the third register, and the fourth addition output coupled to a fourth subset of bits of the third register.

6. The system of claim 5, wherein the controller is configurable to, responsive to receiving the instruction, cause the third and fourth multiplication circuits and the third and fourth addition circuits to perform the third and fourth MAC operations within the clock cycle.

7. The system of claim 3, wherein the first register is configurable to store input data, the second register is configurable to store weight data, and the first and second multiplication circuits and the first and second addition circuits are configurable to implement the first and second MAC operations of a convolutional neural network layer on the input data and the weight data to generate output data, and store the output data at the third register.

8. The system of claim 1, further comprising:
a third multiplication circuit having third multiplication inputs and a third multiplication output, the third multiplication inputs coupled to the first and second registers;
a fourth multiplication circuit having fourth multiplication inputs and a fourth multiplication output, the fourth multiplication inputs coupled to the first and second registers;
a third addition circuit having third addition inputs and a third addition output, the third addition inputs coupled to the first multiplication output and the third multiplication output, and the third addition output coupled to one of the first addition inputs; and
a fourth addition circuit having fourth addition inputs and a fourth addition output, the fourth addition inputs coupled to the second multiplication output and the fourth multiplication output, and the fourth addition output coupled to one of the second addition inputs.

9. The system of claim 8, wherein the first and third multiplication circuits and the first and third addition circuits are configurable to perform a first MAC operation, the second and fourth multiplication circuits and the second and fourth addition circuits are configurable to perform a second MAC operation.

10. The system of claim 9, further comprising a controller configurable to, responsive to receiving an instruction, cause the first, second, third and fourth multiplication circuits and the first, second, third, and fourth addition circuits to perform the first and second MAC operations in a the clock cycle.

11. The system of claim 10, wherein the first register is configurable to store input data, the second register is configurable to store first and second weight data, and the first, second, third and fourth multiplication circuits and the first, second, third, and fourth addition circuits are configurable to implement the first and second MAC operations of a fully connected neural network layer on the input data and the first and second weight data to generate output data, and store the output data at the third register.

12. The system of claim 4, wherein the instruction includes:
a first field indicating a first address of the first register;
a second field indicating a second address of the second register;
a third field indicating a third address of the third register; and
a fourth field indicating a configuration parameter for the first and second MAC operations.

13. The system of claim 4, wherein the instruction is a reduced instruction set computer (RISC) instruction.

14. The system of claim 4, wherein each of the first and second MAC operations is a respective ternary MAC operation.

15. The system of claim 7, further comprising a fourth register, and controller is configurable to cause the first and second multiplication circuits and the first and second addition circuits to store results of the first and second MAC operations as part of a look up table (LUT) at the fourth register.

16. The system of claim 15, wherein the LUT maps a set of combinations of weights to a set of MAC results, and the controller is configurable to retrieve a MAC result from the LUT responsive to receiving a particular combination of weights.

17. The system of claim 4, wherein the controller, the first and second addition circuits, the first and second multiplication circuits, and the first, second, and third registers are part of a processor.

* * * * *